(12) United States Patent
Frampton et al.

(10) Patent No.: US 10,581,358 B2
(45) Date of Patent: Mar. 3, 2020

(54) ALTERNATOR FLUX SHAPING

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 15/941,371

(22) Filed: Mar. 30, 2018

(65) Prior Publication Data

US 2019/0305704 A1    Oct. 3, 2019

(51) Int. Cl.
| | | |
|---|---|---|
| *H02P 9/40* | (2006.01) | |
| *H02K 11/225* | (2016.01) | |
| *H02K 11/30* | (2016.01) | |
| *H02K 1/17* | (2006.01) | |
| *H02K 7/18* | (2006.01) | |
| *H02K 7/20* | (2006.01) | |
| *H02K 16/00* | (2006.01) | |

(Continued)

(52) U.S. Cl.
CPC .............. *H02P 9/40* (2013.01); *H02K 1/17* (2013.01); *H02K 7/1815* (2013.01); *H02K 7/20* (2013.01); *H02K 11/225* (2016.01); *H02K 11/30* (2016.01); *H02K 16/00* (2013.01); *H02K 21/34* (2013.01); *H02P 9/009* (2013.01); *B60L 50/10* (2019.02); *B60L 2220/50* (2013.01); *H02K 3/26* (2013.01); *H02K 16/04* (2013.01); *H02K 2201/03* (2013.01); *H02K 2203/03* (2013.01); *H02K 2211/03* (2013.01); *Y10S 903/902* (2013.01)

(58) Field of Classification Search
CPC ............ H02K 1/17; H02K 7/20; H02K 16/00; H02K 16/02; H02P 9/40
See application file for complete search history.

(56) References Cited

U.S. PATENT DOCUMENTS

| | | |
|---|---|---|
| 3,072,813 A | 1/1963 | Reijnst et al. |
| 4,242,610 A | 12/1980 | McCarty et al. |

(Continued)

FOREIGN PATENT DOCUMENTS

| | | |
|---|---|---|
| CN | 203851065 U | 9/2014 |
| CN | 104467334 A | 3/2015 |

(Continued)

OTHER PUBLICATIONS

"Wedge magnets for axial flux PM motor generator manufacturers", http://www.greatmagtech.com/products_info/Wedge-magnets-for-axial-flux-PM-motor-generator-336191.html, date accessed: (Feb. 12, 2017).

(Continued)

*Primary Examiner* — Sean Gugger
(74) *Attorney, Agent, or Firm* — Lempia Summerfield Katz LLC

(57) ABSTRACT

An electric machine includes a stator, a rotor, and magnets. The stator includes multiple flux members having ferrous material. The rotor is configured to rotate relative to the stator and spaced from the stator by an air gap. The magnets are rigidly mounted to the flux members of the stator. At least a first magnet and a second magnet of the magnets includes an elongated axis parallel to a radius of the rotor and a minor axis perpendicular to the elongated axis, and a first pole of the first magnet having a first polarity and positioned along the minor axis to face a first pole of the second magnet having the first polarity.

19 Claims, 24 Drawing Sheets

ROTOR ASSEMBLY

(51) Int. Cl.
*H02P 9/00* (2006.01)
*H02K 21/34* (2006.01)
*B60L 50/10* (2019.01)
*H02K 16/04* (2006.01)
*H02K 3/26* (2006.01)

(56) References Cited

U.S. PATENT DOCUMENTS

| | | | |
|---|---|---|---|
| 5,047,681 A | 9/1991 | Gaillard et al. | |
| 5,109,172 A | 4/1992 | Pace | |
| 5,783,893 A * | 7/1998 | Dade | H02K 16/00 310/114 |
| 6,111,329 A * | 8/2000 | Graham | H02K 3/26 29/598 |
| 6,323,572 B1 | 11/2001 | Kinoshita | |
| 6,570,278 B1 * | 5/2003 | Falanga | H02K 16/02 310/113 |
| 6,590,312 B1 * | 7/2003 | Seguchi | B60K 6/26 310/266 |
| 8,373,325 B2 | 2/2013 | Ichiyama | |
| 8,772,998 B2 * | 7/2014 | Maximov | H02K 1/148 310/156.01 |
| 9,735,637 B2 | 8/2017 | Akamatsu et al. | |
| 2002/0079769 A1 * | 6/2002 | Akiwa | H02K 1/187 310/156.06 |
| 2003/0020353 A1 * | 1/2003 | Lopatinsky | H02K 1/2793 310/208 |
| 2005/0057112 A1 * | 3/2005 | Lopatinsky | F04D 25/066 310/208 |
| 2006/0038454 A1 * | 2/2006 | Bojiuc | H02K 7/20 310/112 |
| 2006/0138879 A1 | 6/2006 | Shin et al. | |
| 2007/0057514 A1 * | 3/2007 | Mukai | H02K 16/00 290/40 C |
| 2007/0210666 A1 * | 9/2007 | Yoshida | H02K 3/50 310/191 |
| 2008/0036326 A1 * | 2/2008 | Kito | H02K 1/17 310/154.14 |
| 2009/0152956 A1 * | 6/2009 | Yang | H02K 1/02 310/12.25 |
| 2009/0315329 A1 * | 12/2009 | Duffey | H02K 16/02 290/44 |
| 2010/0052626 A1 * | 3/2010 | Tupper | H02K 19/20 322/61 |
| 2010/0181858 A1 * | 7/2010 | Hibbs | H02K 1/27 310/156.07 |
| 2011/0084567 A1 * | 4/2011 | Ichiyama | H02K 1/2746 310/181 |
| 2011/0210634 A1 * | 9/2011 | Dupeux | H02K 1/17 310/154.28 |
| 2011/0304224 A1 * | 12/2011 | Anghel | F02N 11/04 310/46 |
| 2013/0093275 A1 * | 4/2013 | Kim | H02K 16/00 310/114 |
| 2013/0093276 A1 * | 4/2013 | Kim | H02K 16/00 310/114 |
| 2013/0207391 A1 * | 8/2013 | Hemmelmann | H02K 16/00 290/44 |
| 2013/0207488 A1 * | 8/2013 | Labbe | H02K 1/04 310/43 |
| 2013/0249343 A1 * | 9/2013 | Hunstable | H02K 1/17 310/177 |
| 2013/0334914 A1 * | 12/2013 | Dugue | H02K 5/20 310/64 |
| 2014/0252900 A1 | 9/2014 | Mandes | |
| 2014/0312745 A1 * | 10/2014 | Nicoloff | H02K 29/03 310/67 R |
| 2015/0048704 A1 * | 2/2015 | Fahimi | H02K 16/04 310/156.01 |
| 2015/0330011 A1 * | 11/2015 | Kim | D06F 37/30 318/3 |
| 2016/0094096 A1 * | 3/2016 | Hunstable | H02K 23/04 310/154.28 |
| 2017/0194822 A1 * | 7/2017 | Wu | H02K 23/36 |
| 2018/0097410 A1 * | 4/2018 | Dubus | H02K 23/04 |
| 2019/0068035 A1 * | 2/2019 | Koizumi | H02K 21/14 |

FOREIGN PATENT DOCUMENTS

| | | |
|---|---|---|
| EP | 3026810 A2 | 6/2016 |
| EP | 3026810 A3 | 7/2016 |
| GB | 2130810 A | 6/1984 |
| GB | 2488129 A | 8/2012 |
| RO | 130807 A2 | 12/2015 |
| UA | 105694 C2 | 6/2014 |
| WO | WO2015056268 A1 | 4/2015 |

OTHER PUBLICATIONS

European Search Report for corresponding Application No. 19162838.7-1201, dated Jul. 24, 2019.

* cited by examiner

ALTERNATOR FLUX SHAPING

TECHNICAL FIELD

This disclosure relates in general to the field of electric machines including motors and generators, and in particular, the control of magnetic flux produced in an electric machine.

BACKGROUND

Example electrical machines are motors and generators. Motors and generators may include permanent magnets that establish a magnetic field. Another component in the electrical machine comes in contact with the magnetic field and moves relative to the magnetic field. The magnetic field applies a force to a driven portion for a motor, and the magnetic field induces a current in the armature of a generator. The torque of the motor and the electrical output of the generator are limited by the size and strength of the permanent magnets.

Permanent magnets may be cost prohibitive especially for larger permanent magnets. Relative to other materials of the electrical machine such as iron and steel, the permanent magnets are very costly. The following embodiments include techniques for improving the operation of permanent magnets to achieve a stronger magnetic field without increasing the size of the permanent magnets.

BRIEF DESCRIPTION OF THE DRAWINGS

Exemplary implementations are described herein with reference to the following drawings.

DETAILED DESCRIPTION

An electric machine may be an electromagnetic rotor machine that includes a rotor and a stator. The rotor and stator are positioned on opposite sides of an air gap through which a magnetic field is present and magnetic flux flows between the rotor and the stator. The magnetic field may be created by permanent magnets. While other examples are possible, the electric machine may be a motor or a generator. The generator, which may be referred to as an engine-generator set or a genset, may include a power source (e.g., an engine) and an alternator or another device for generating electrical energy or power from mechanical energy. The motor, on the other hand, receives electrical energy and converts it to mechanical energy by outputting torque.

The permanent magnets generate a magnetomotive force from the alignment of magnetic dipoles. The magnetic permeability describes the ability of the material to support a magnetic field. The magnetic reluctance of the magnet is the ratio of the strength of the magnetomotive force to the magnetic flux. The magnetic reluctance and magnetic permeability depend on the material of the permanent magnet. Some permanent magnets such as neodymium magnets have a stronger flux density, or remanence, producing stronger magnetic fields. An electric machine with neodymium magnets may have a better torque/volume ratio and/or torque/weight ratio than other electric machines. The torque/volume ratio is the amount of torque produced by the electric machine divided by the size of the electric machine. The torque/weight ratio is the amount of torque produced by the electric machine divided by the weight of the electric machine.

Figure 1:
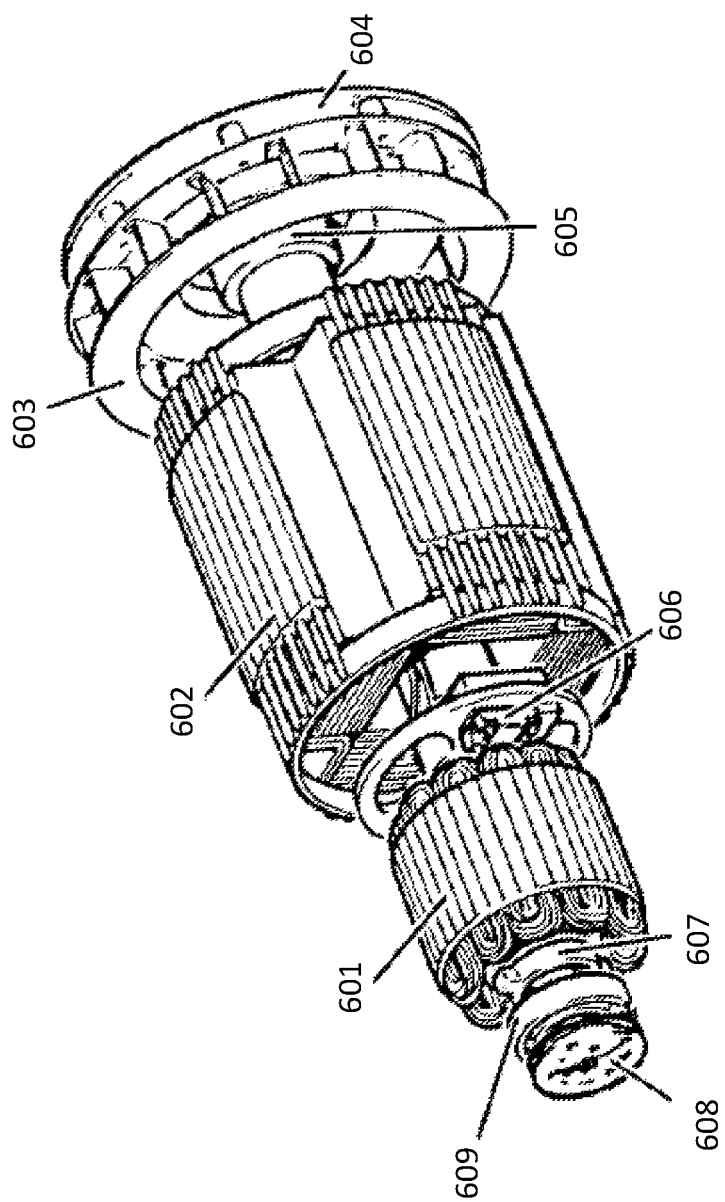
FIG. 1 illustrates an example rotor for an electric machine.
Figure 2:
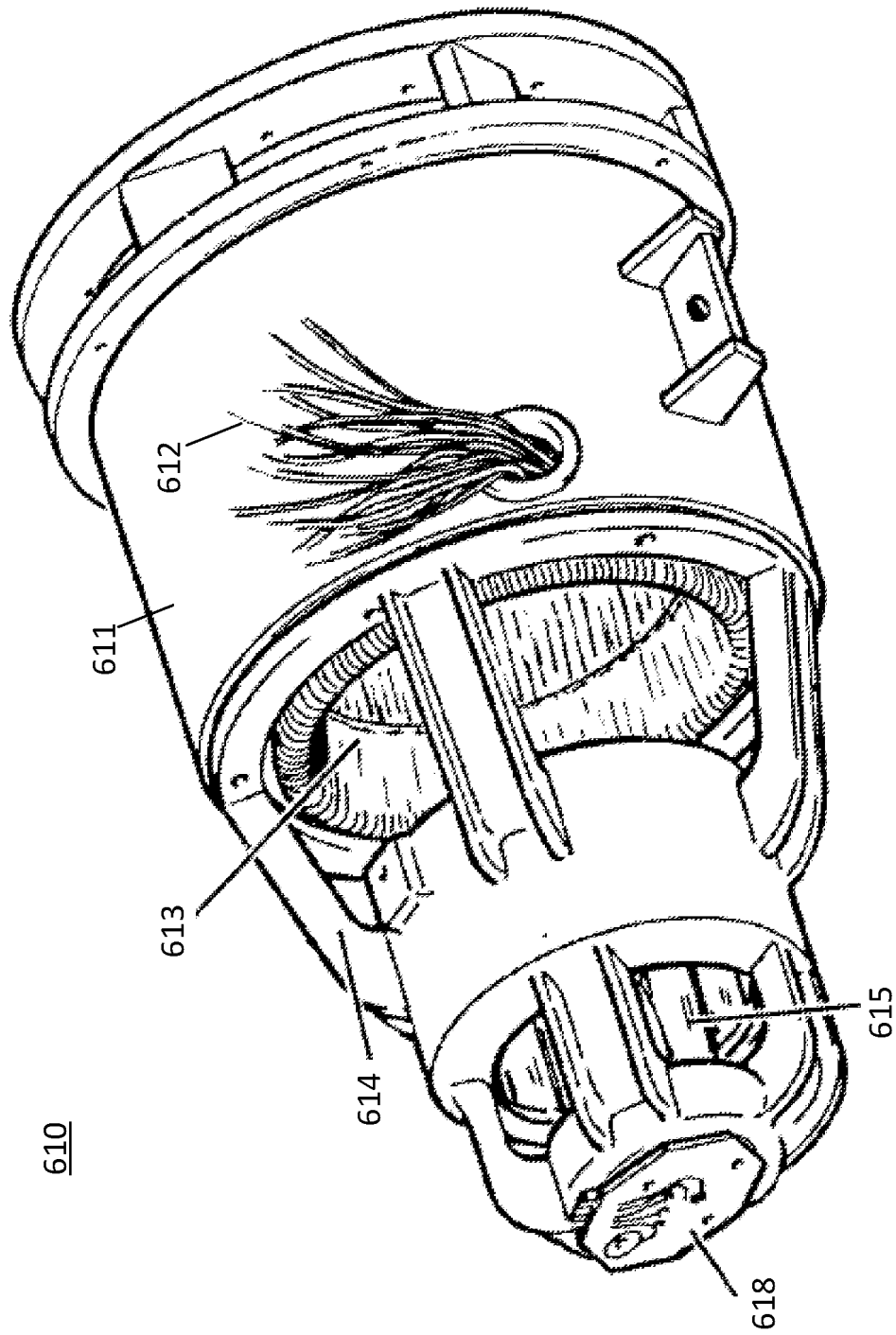
FIG. 2 illustrates an example stator for an electric machine.

FIGS. 1 and 2 illustrate an example of an electric machine including permanent magnets, in this case, for the exciter of a generator. However, the permanent magnets may be included in either the main generator or the exciter. The permanent magnets may be included in either the rotor or the stator. Rather than the generator as shown, the permanent magnets may be included in a motor.

FIG. 1 illustrates an example rotor assembly 600 for an electric machine. The rotor assembly 600 may include an exciter armature 601, a field coil assembly 602, a cooling fan 603, drive discs 604, a coupling 605, a rotor controller 606, a sensor 607, a rotor communication device 608, and a rotor bearing 609. Additional, different, or fewer components may be included.

The coupling 605 and/or drive discs 604 couple the rotor assembly 600 to a prime mover such as an engine. The coupling 605 is a fixed connection between the rotor assembly 600 and the engine via drive discs 604. The engine turns the rotor assembly 600, rotating the exciter armature 601 along with the field coil assembly 602. The engine may also turn the cooling fan 603. The cooling fan 603 forces air across the field coil assembly 602, the rotor controller 606, and/or the exciter armature 601, any of which may expel heat as current flows through the windings or other electrical components.

FIG. 2 illustrates an example stator assembly 610 for an electric machine. The stator assembly 610 includes a stator chassis 611, a set of leads 612, armature 613, an end bracket 614, an exciter field assembly 615, and a stator communication device 618. Additional, different, or fewer components may be included. The rotor assembly 600 fits inside the stator assembly 610. The exciter field assembly 615 is aligned with the exciter armature 601. The stator chassis 611 is aligned with the field coil assembly 602.

The exciter armature 601 includes exciter armature windings, and the exciter field assembly 615 includes permanent magnets as a source of magnetic flux. As the exciter armature windings rotate within the stator assembly 610, one or more currents are generated in the exciter armature windings. Two or more wires or other electrically conductive connections connect the exciter armature windings to the field coil assembly 602. The current from the exciter armature windings supplies current to the field coil assembly 602.

In this example, the stator includes the armature 613 with windings and the exciter includes permanent magnets. As the field coil assembly 602 rotates within the stator assembly 610, currents are generator in the armature 613. The current from the windings 613 is carried by the leads 612 to a load.

Figure 3:
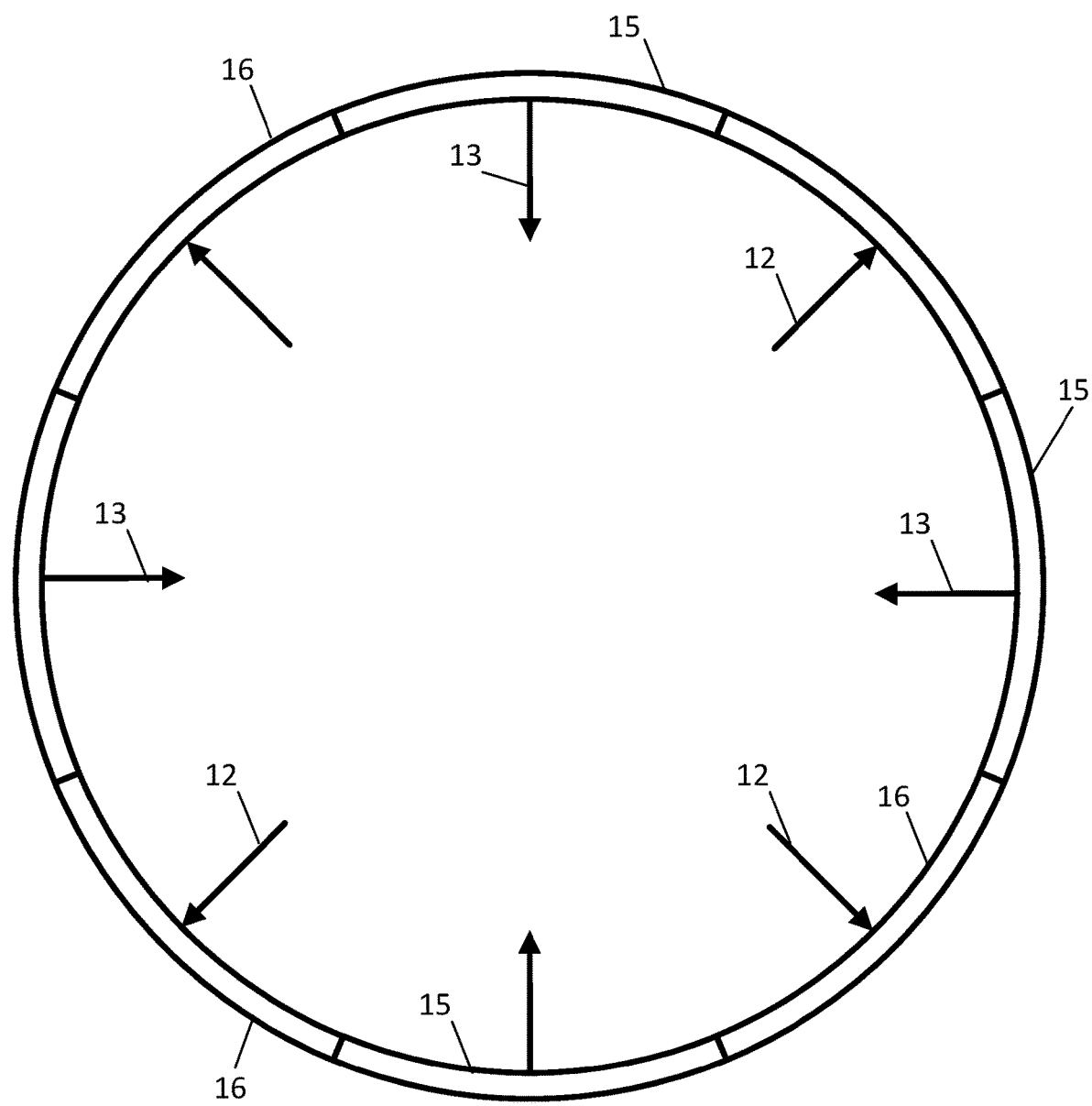
FIG. 3 illustrates an example curvilinear arrangement of magnets for an electric machine.

FIG. 3 illustrates an example curvilinear arrangement of magnets for an electric machine. Flux flows out from the north poles of magnets 15, as shown by arrows 13, through the rotor and back to the south pole of others of the magnets 16, as shown by arrows 12. The flux path generated by the magnets 15 and 15 induces a current through coils or windings in the rotor. The rotor is substantially circular (i.e., it may not be a perfect circle but is generally circular in shape such that the average curvature of the rotor is within a predetermined range around the circumference of the rotor). The magnets 15 and 16 are curved to be generally parallel to the rotor. This curved shape for magnets 15 and 16 allows for a simplified machining process for the mounting point for the magnets while permitting design for uniform flux distribution across poles, but limits the available flux density in the air gap to the maximum flux density produced by each of the permanent magnets.

In addition, the arrangement of magnets shown in FIG. 3 requires two types of curved magnets including the center facing north magnet 15, oriented with the north pole facing the center, and the center facing south magnet 16, oriented with the south pole facing the center. Magnets 15 and 16 are placed in an alternating sequence around the inner diameter of the mounting surface to provide time-varying magnetic flux to an armature rotating within the circular space defined by the inner diameter of the permanent magnets.

The following embodiments illustrate shapes and constructions of magnets and possibly flux-shaping (ferrous) material for the stator that may provide higher flux density in the air gap between the rotor and stator than the flux density produced by the permanent magnets themselves. When the magnetic flux in the air gap between the rotor and the stator is increased without reducing the size of the magnets and other structure, the electrical machine is typically capable of supplying more power. In the case where the electrical machine is a motor, higher flux density may allow the motor to produce more torque at a given speed.

The improved magnetic flux in the electrical machine also reduces heat produced for the electric machine. Heat is a necessary but damaging byproduct of an electric machine. The heat can damage laminations and windings. When the magnetic flow is improved (e.g., increase in magnetic flux by 50%) the number of windings of the rotor can be reduced (e.g., drop number of turns by 33%). Fewer turns on the windings of the rotor produce less heat (e.g., heat reduced by 33%).

Moreover, an increase in the magnetic flux between the rotor and the stator allows the size of the electric machine to be reduced for a given desired output. For example, if a 10 kW rated electric machine requires a footprint size of 0.25 $m^2$, when the magnetic field is increased by 50%, the same electric machine may be reduced by about 33% and require only a footprint size of approximately 0.17 $m^2$.

Figure 4:
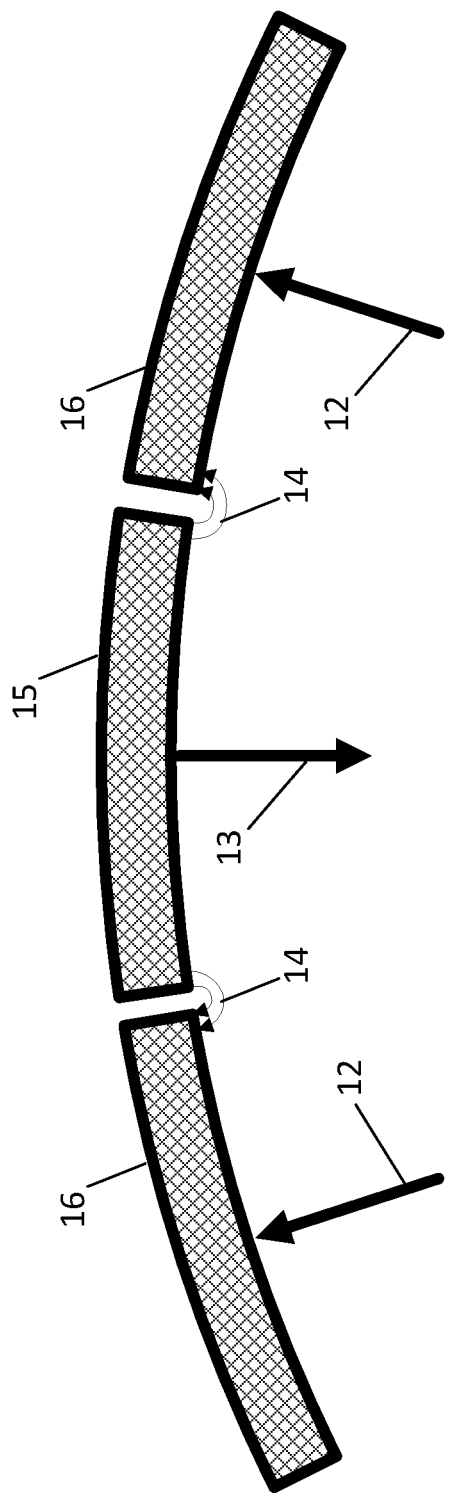
FIG. 4 illustrates an example flux leakage for the curvilinear arrangement of magnets of FIG. 3.

FIG. 4 illustrates an example flux leakage 14 for the curvilinear arrangement of magnets. The flux leakage 14 is caused by the arrangement of magnets. Because the N pole of center facing north magnet 15 is very close to the S pole of center facing south magnets 16, some flux flows between magnets in a path that does not pass through the iron of the inner electric machine (e.g. exciter armature). Flux that does not pass through the iron of the inner electric machine does not produce voltage or power and is therefore wasted. Such flux is often referred to as leakage flux. Leakage flux can be reduced by increasing the spacing between the magnets, but this brings with it other design considerations, such as reduced machine output power, increased size, and increased difficulty of assembly.

Figure 5:
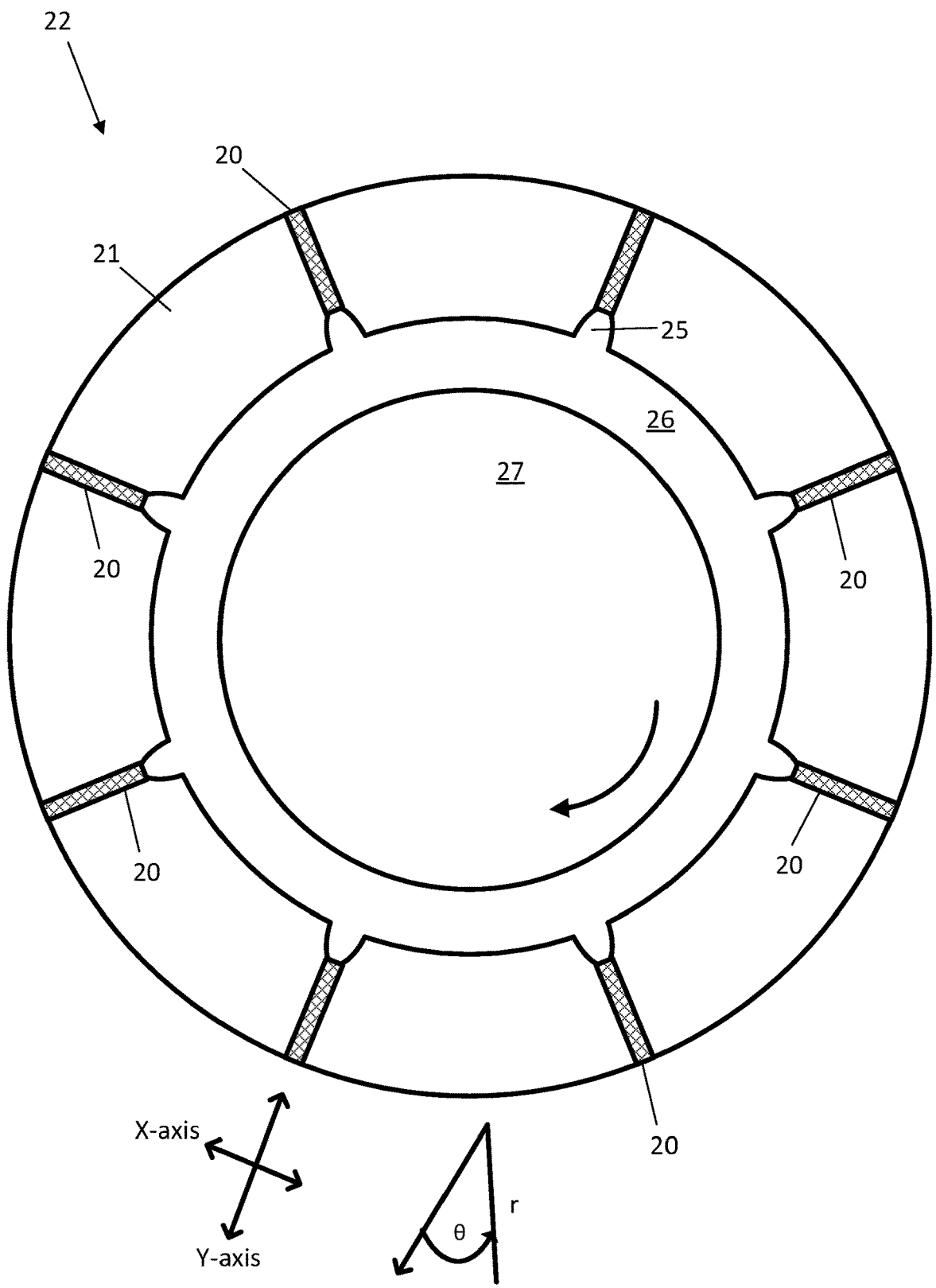
FIG. 5 illustrates an example radial arrangement of magnets for an electric machine.
Figure 6:
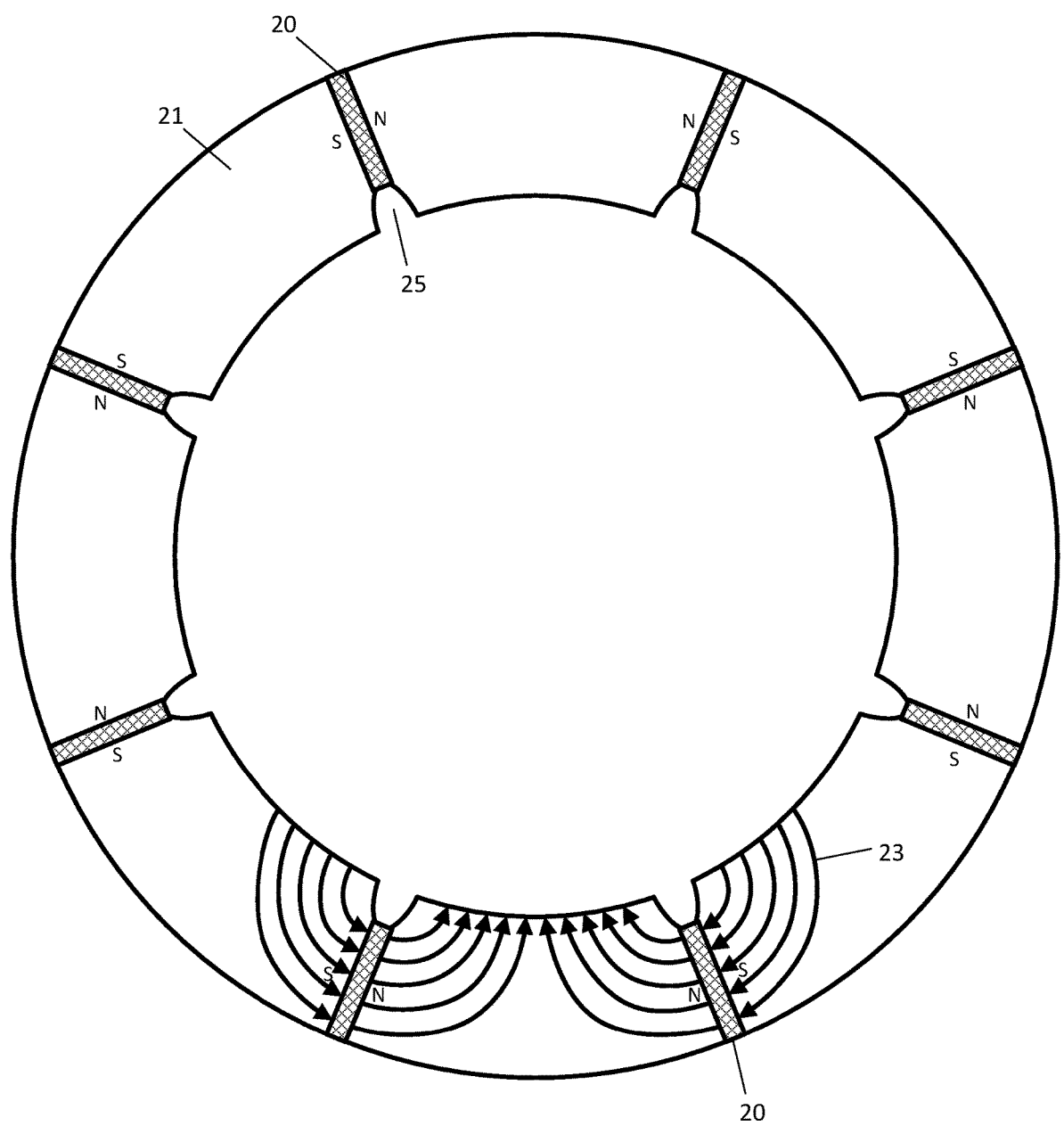
FIG. 6 illustrates an example flux path for the radial arrangement of magnets of FIG. 5.

FIG. 5 illustrates an example radial arrangement of magnets for an electric machine. The electric machine includes a stator 22 and a rotor 27 separated by air gap 26. The stator 22 includes magnets 20 spaced apart by flux-shaping members 21. FIG. 6 illustrates an example flux path 23 for the radial arrangement of magnets 20 of FIG. 5. Additional, different, or fewer components may be included.

The stator 22 is configured to provide a magnetic field to the rotor 27 where a current is induced in a coil of wire. The stator 22 has a circular shape that includes an alternating sequence of the magnets 20 and flux-shaping members 21 along the circumference of the stator 22.

The flux-shaping members 21 are formed of ferrous material. The magnetic permeability of the flux-shaping members 21 is much higher than the magnetic permeability of the magnets 20 and the air surrounding the machine. The magnetic reluctance of the flux-shaping members 21 is much lower than the magnetic reluctance of the magnets 20. The flux-shaping members 21 provide a lower reluctance path for the magnetic flux produced by the permanent magnets 20, shaping the flux to flow through the rotor 27.

Each magnet in the radial arrangement of magnets 20 may be a rectangular prism or another three-dimensional shape. The three-dimensional shape has three axes. The primary axis for a permanent magnet is the axis along which the magnetic flux lines align (e.g. the magnetized direction). In addition, each magnet has two secondary axes, mutually orthogonal to the primary axis. The primary direction may be in the direction of the largest dimension of the three-dimensional shape. The secondary axis in in the direction of the second largest dimension of the three-dimensional shape. The tertiary axis in in the direction of the smallest dimension of the three-dimensional shape. In the example of FIGS. 5 and 6, the primary axis is oriented in a direction circumferential to the rotation of the electrical machine. Other ways of mounting the magnets 20 may place the magnets 20 with their primary axis oriented axially, parallel with the axis of rotation of the electric machine, and still other ways of mounting the magnets 20 may orient the magnets 20 in a radial direction relative to the axis of rotation of the electric machine.

The position of the magnets may be described with polar coordinates such that one of the dimensions of each of the magnets is positioned at a particular angle theta (θ) at a particular radius (r) away from the center of the rotor 27.

The primary axis may along the rotor 27, the secondary axis is labeled as the y-axis, and the tertiary axis is labeled as the x-axis. Either the primary axis or the secondary axis may be considered an elongated axis. These axes are elongated in that they are longer than the tertiary axis. The y-axis, as labeled in FIG. 5, is a major axis or an elongated axis that is also substantially parallel to a radius of the rotor 27. The term substantially parallel may refer to parallel or at an angle within a predetermined range (e.g., within 5 or 10 degrees) to parallel with the radius of the rotor 27. The x-axis, as labeled in FIG. 5, is a minor axis substantially perpendicular to the elongated axis. The term substantially perpendicular may refer to perpendicular or at an angle within a predetermined range (e.g., within 5 or 10 degrees) to perpendicular.

Each magnet in the radial arrangement of magnets 20 is secured to the stator 22. As compared to magnets 15 and 16 in FIGS. 3 and 4, the radial arrangement of magnets 20 may be attached to the stator 22 in a more secured manner. The magnets 15 and 16 in FIG. 3 have poles that are generally aligned. For example, the north (N) pole of one magnet is next to the south (S) pole of an adjacent magnets. The magnets do not generally resist this position. However, the magnets 20 of FIGS. 5 and 6 are arranged to have like poles facing one another. That is, the N pole of one magnet is closer to the N pole of an adjacent magnet that the S pole of the adjacent magnet. This causes adjacent magnets 20 to repel each other. To resist this force and keep the magnets in place, a secure physical connection is made between the stator 22 and the magnets 20. The physical connection may include a clamp or a bolt for each of the magnets 20 that connects the respective magnet to the stator 22 or a holder designed for the purpose of securing the magnets 20.

Each magnet in the radial arrangement of magnets 20 has two poles, each of opposite polarity such the N pole and the S pole. Each adjacent magnet is positioned in the opposite orientation in the radial direction of the stator 22 so that like poles face each other. For any two adjacent magnets 20, a first pole of the first magnet has a first polarity (e.g., N) and faces a first pole of the second magnet having the first polarity (e.g., N). Likewise, for a third magnet on the opposite side of the first magnet as the second magnet, a second pole of the first magnet has a second polarity (e.g., S) and faces a second pole of the third magnet having the second polarity (e.g., S).

The flux shaping members 21 are positioned between adjacent magnets 20. Each flux-shaping member 21 is proximate to and may be in contact with the adjacent magnets 20. Each flux-shaping member 21 is proximate to and may be in contact with poles of the same polarity for the adjacent magnets 20. That is, for a particular flux-shaping member 21 proximate to a first magnet and a second magnet, the particular flux-shaping member 21 is proximate to the first polarity (e.g., N) pole of the first magnet and the first polarity (e.g., N) pole of the second magnet. Two adjacent flux-shaping members 21 are proximate two poles of different polarities.

The flux-shaping members 21 may be formed in a variety of 2-dimensional and 3-dimensional shapes. For example, the flux-shaping members 21 may have a keystone shape, a trapezoidal shape, or a curved trapezoidal shape. The curved trapezoid may include an internal face having a curvature substantially parallel to the rotor 27. A curved trapezoidal shape may be constructed from a first circle having a first radius of curvature and a second circle having a second radius of curvature with two lines in the radial direction connected the first circle and the second circle. The flux-shaping member 21 may be formed in the shape along the first circle to one of the lines, along the second circle, to the other of the lines, and back to the first circle. The flux-shaping members 21 may be discretely formed and assembled or created as features of a larger unified geometry, an example of the latter being features in a stacked set of laminated steel sheets cut or punched to include flux-shaping geometry.

The flux-shaping member 21 may be shaped as an annulus sector. The annulus sector may span a predetermined angle. The angle may be selected according to the number of poles of the electric machine. As the number of poles of the electric machine is higher, the predetermined angle is lower. Example angles may include 2, 5, 12, 15, or another number in degrees. In one example, the angle is (360/number of poles)–n, where n represents the span of the magnet 20 (e.g., 2, 4, 6, or another angle in degrees).

The inner edges of the flux-shaping members 21 may be tapered to form a cutout or cavity 25. The tapering may be diagonal or curved. The cavity 25 may be between adjacent inner surfaces of the flux-shaping members 21. The cavity 25 may reduce the leakage flux across the magnets 20 or between the flux-shaping members 21. When a cavity 25 is present, the length of the magnet 20 in the y-axis direction may be less than the length of the flux-shaping member 21 in the y-axis direction approximately by the size of the cavity 25.

The flux lines of the flux path 23 illustrate the flow of flux from the magnets 20 to the rotor 27 and back to the magnets 20. For any magnet, the flux path flows from a first pole (e.g., N) to the rotor 27 and back to the second pole (e.g., S). For any flux-shaping member 21, the flux path 23 from both magnets, which is an adjacent pair of magnets, flows in the same direction, which is either away from the rotor 27 or toward the rotor 27. For example, FIG. 6 illustrates that the flux path 23 from the N pole of two adjacent magnets 20 flows through a single flux-shaping member 21 toward the rotor 27. For the next flux-shaping members 21 on either side, the flux path 23 to the S pole of two adjacent magnets flows through a single flux-shaping member 21 away from the rotor 27. Thus, the flux path 23 through any flux-shaping member 21 is substantially in the same direction and the direction alternates among flux-shaping members 21 around the circumference of the stator 27.

A pole of the electrical machine includes a south facing magnetic flux or a north facing magnetic flux. Arranging the magnets 20 as shown in FIG. 6 provides the advantage of each magnet producing magnetic flux that contributes to the flux of two poles while providing each pole with two magnets. Thus, for any two adjacent magnets 20, each of the magnets is associated with (e.g., contributes to) the flux to one of the electromagnetic poles of the electrical machine.

For one pair of magnets, the flux flows from the magnets to the pole of the electrical machine, and for the next pair of magnets, the flux flows toward the magnets from the pole of the electrical machine. The flux path for a magnet passes through two electromagnetic poles of the electrical machine, and the flux paths for an electromagnetic pole of the electric machine passes through two magnets. This arrangement is advantageous to the design illustrated in FIGS. 3 and 4 because the total magnetic flux provided to the air gap through the poles of the machine is doubled with the same magnetic material usage.

The arrangement of magnets 20 with like poles facing each other increases the strength of the magnetic flux density through the rotor, using the sides of each of the magnets 20 to drive flux additively into common poles of rotor 27. Due to the reduced length of the low permeability path across the magnet and the length of the low permeability path between individual flux-shaping members 21, the arrangement of magnets 20 with like poles facing each other may increase the flux produced relative to an arrangement like FIGS. 3 and 4.

In an alternative embodiment, the magnets may be rotated such that the radial axis of the magnet is oriented at an angle to the radial axis of the rotor 27. The angle may be 20 to 50 degrees or another value. For each adjacent pair of magnets 20, the magnets 20 may be rotated toward each other to bring like poles even closer together. For a given pair of magnets, the arrangement would look like a V-shape. The flux-shaping member 21 may also be resized in a V-shape to accommodate the position of the magnets 20.

In any of the embodiments described herein, the rotor (e.g., rotor 27) may include coils integrated with a printed circuit board (PCB). The printed circuit board includes coils of wire, or traces, that are energized in response to relative movement of the magnets 20. The coils may be included in different layers of the printed circuit board. Because the coils reside on the printed circuit board, the armature reactance (caused by the permeability of the iron used to direct the magnetic flux through the windings) is much lower, decreasing the voltage drop under load and improving the efficiency of the generator.

The printed circuit board (PCB) may include other components in addition to the windings. For example, a generator controller may be mounted on and configured to rotate with the PCB. The generator controller may include a control circuit, for example, including transistors and/or diodes, and/or for conditioning an input signal. The generator controller may include at least one microprocessor configured to analyze data and generate an operating parameter for a field current setting based on the change in the electrical characteristic of the field winding and/or adjust field current setting according to a field current profile. Other traces on the PCB may connect other components such as sensors and communication hardware to the PCB. Other operating parameters may include commands for the generator to modify the output of the exciter or the output of the generator. The generator controller may control the output of the exciter based on a target value. The generator controller may perform load balancing, load shedding, or other paralleling functions for a set of generators.

The shape of the exciter windings may include concentric circles, rectangles, trapezoids to match magnet shape, or another shape. The exciter windings may be formed from copper or another conductive material. The exciter windings may exist as traces on multiple layers of a PCB. The traces forming the exciter windings are configured to induce a field current in response to magnetic fields of the stator magnets.

Figure 7:
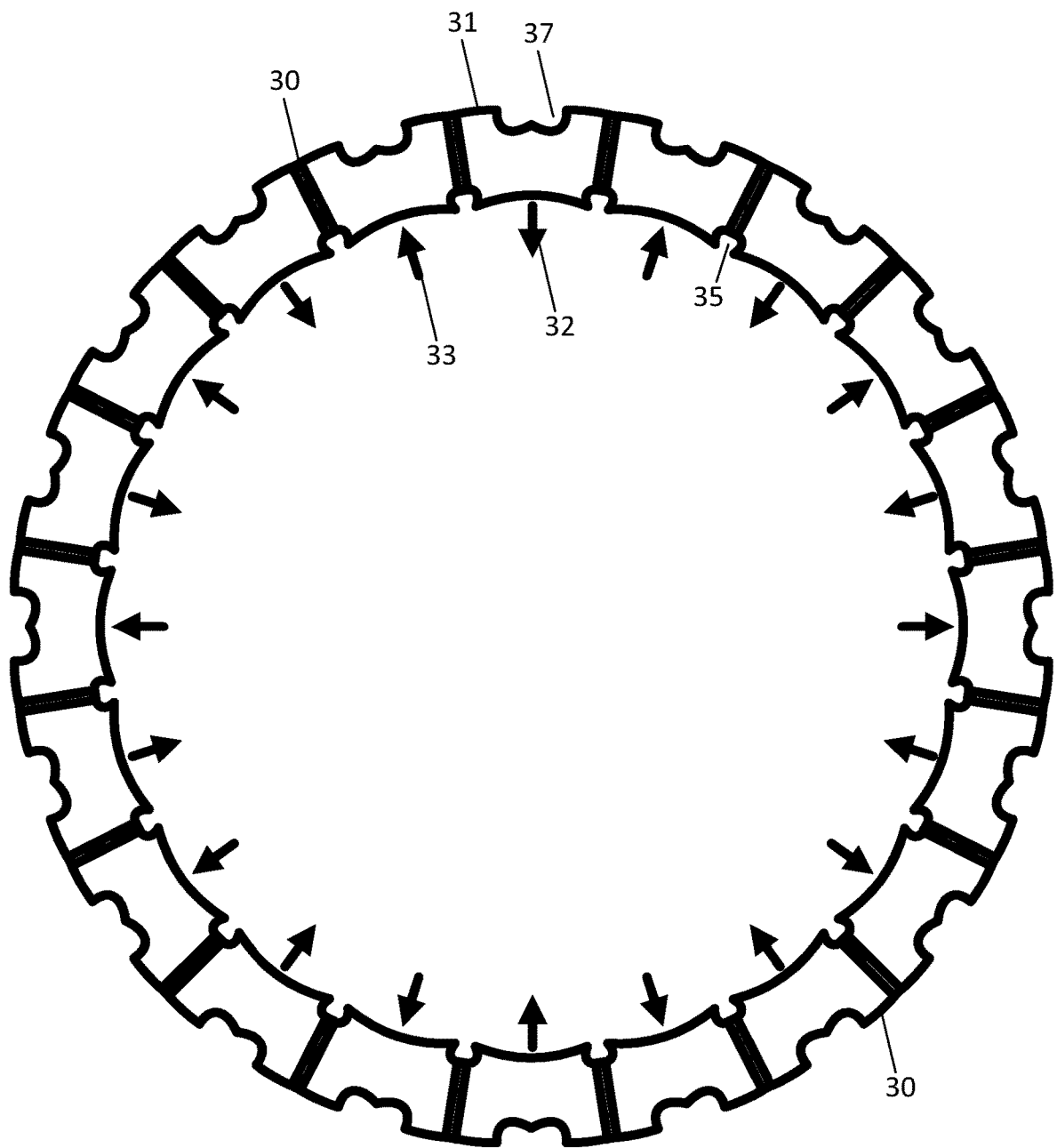
FIG. 7 illustrates another example radial arrangement of magnets for an electric machine.
Figure 8:
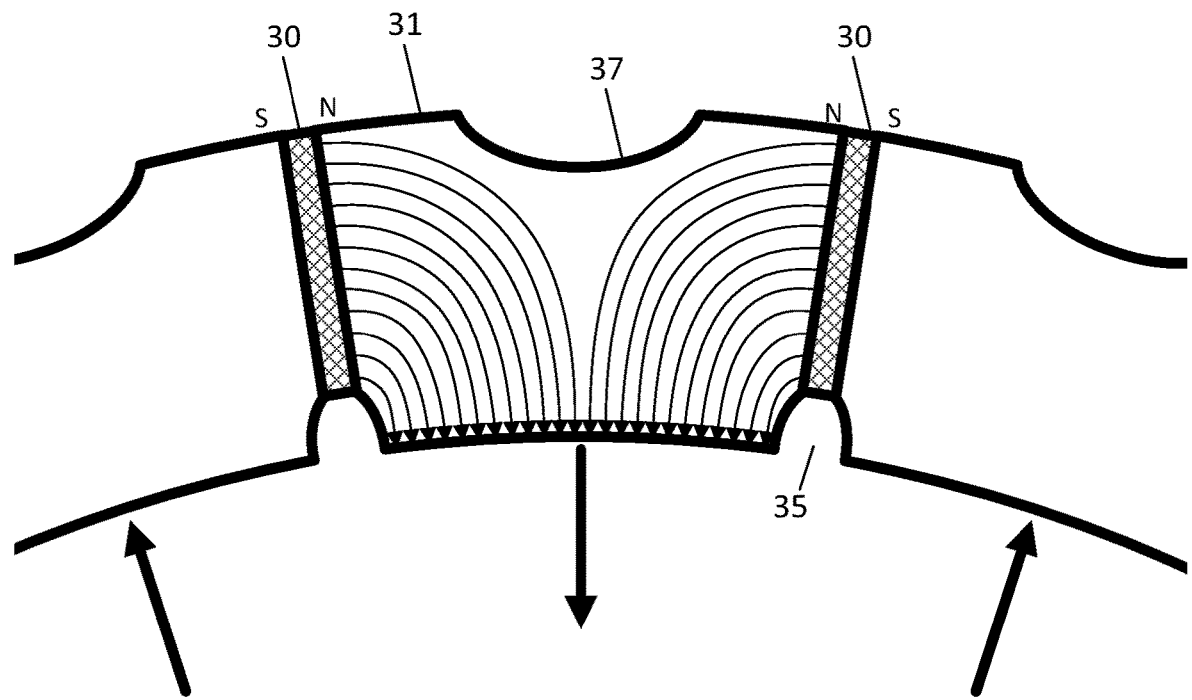
FIG. 8 illustrates an example flux path for the radial arrangement of magnets of FIG. 7.

The embodiment of FIGS. 5 and 6 are an 8 pole electric machine. The number of magnets determines the number of poles of the electric machine. The number of poles determines the frequency of the electrical output of a generator or the speed of a motor. FIG. 7 illustrates another example radial arrangement of magnets 30 for an electric machine having 20 poles. FIG. 8 illustrates an example flux path for the radial arrangement of magnets of FIG. 7. Between each adjacent pair of magnets 30 is a highly magnetically permeable material, which may be referred as a flux-shaping member 31. The flux path from one pole of magnets 30 flows through the flux-shaping member 31 toward the rotor, as illustrated by arrow 32, through the rotor, and back toward the other pole of magnets 30 through the next flux-shaping member 31, as illustrated by arrow 33. Additional, different, or fewer components may be included.

The flux-shaping member 31 may include multiple cutouts. An interior cutout 35 provides a recess to the magnet 30 and decreases the amount of leakage between adjacent flux-shaping members. An exterior cutout 37 may be removed from the flux-shaping member 31 to provide a mounting point for the flux-shaping member 31, reduce the weight of the electric machine or reduce the materials required for the flux-shaping member 31. In FIG. 7 the shape of the cutout 37 is two partial circles that overlap. In FIG. 8 the shape of the cutout 37 is a semicircle or arc. The size and shape of the exterior cutout 37 may be selecting to remove portion where little to no flux flows in the flux path to the rotor. The size and shape of the exterior cutout 37 may be made by measuring the flux through the flux-shaping member 31, through magnetic analytical tools, or through trial and error.

Figure 9:
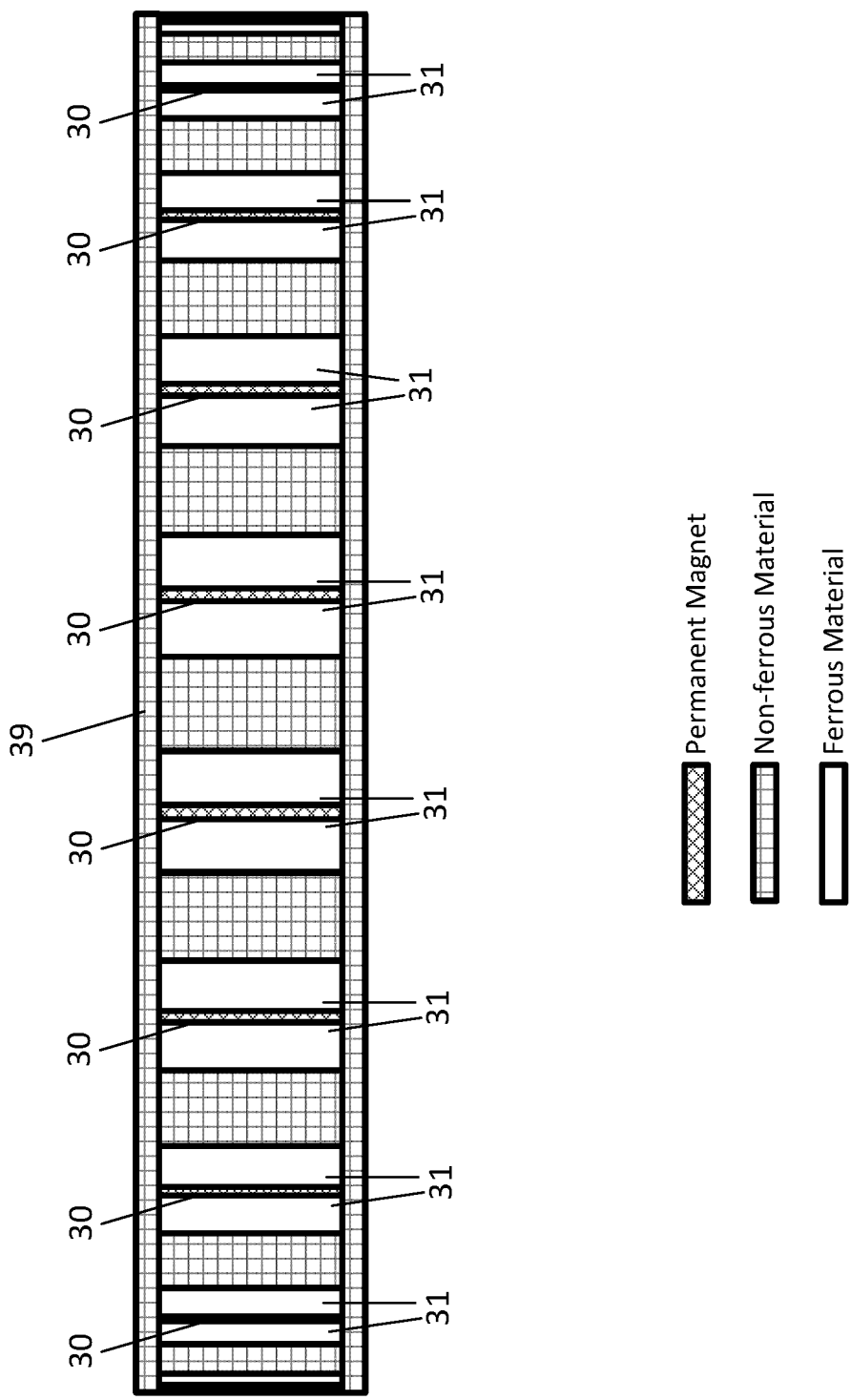
FIG. 9 illustrates a top down view of the radial arrangement of magnets of FIG. 7.
Figure 10:
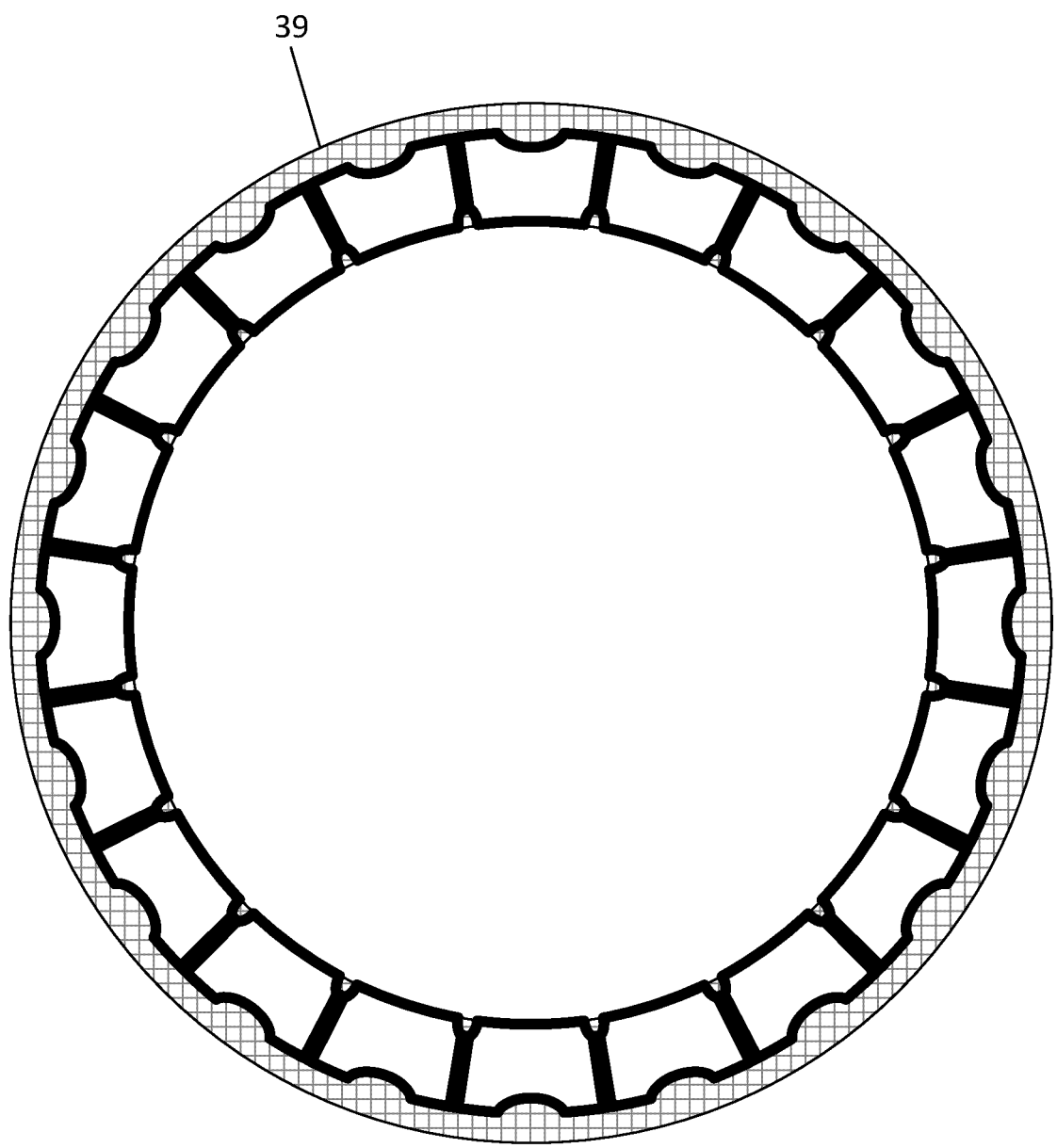
FIG. 10 illustrates support structure for the radial arrangement of magnets of FIG. 7.

FIGS. 9 and 10 illustrate means of restraining the radial arrangement of magnets shown in FIG. 7. FIG. 9 provides a top view of the structure, while FIG. 10 provides an end view. The magnets 30 and flux-shaping members 31 of FIG. 7 are supported by a housing 39. Because the stator 22 is curved or cylindrical, the FIG. 9 top view illustrates smaller widths for the magnets 30 and flux-shaping member 31. FIG. 9 illustrates that the magnets 30 and flux-shaping members 31 are in contract with and physically connected to housing 39 formed of a non-ferrous material. The non-ferrous material has a very high magnetic reluctance (e.g., 100 to 10,000 times more than the flux-shaping members 31) and a very low magnetic permeability (e.g., $\frac{1}{100}$ to $\frac{1}{10,000}$ that of the flux-shaping members 31). The housing 39 may be formed of aluminum, titanium, stainless steel, plastic, a ceramic material, or any another low permeability material.

Figure 11:
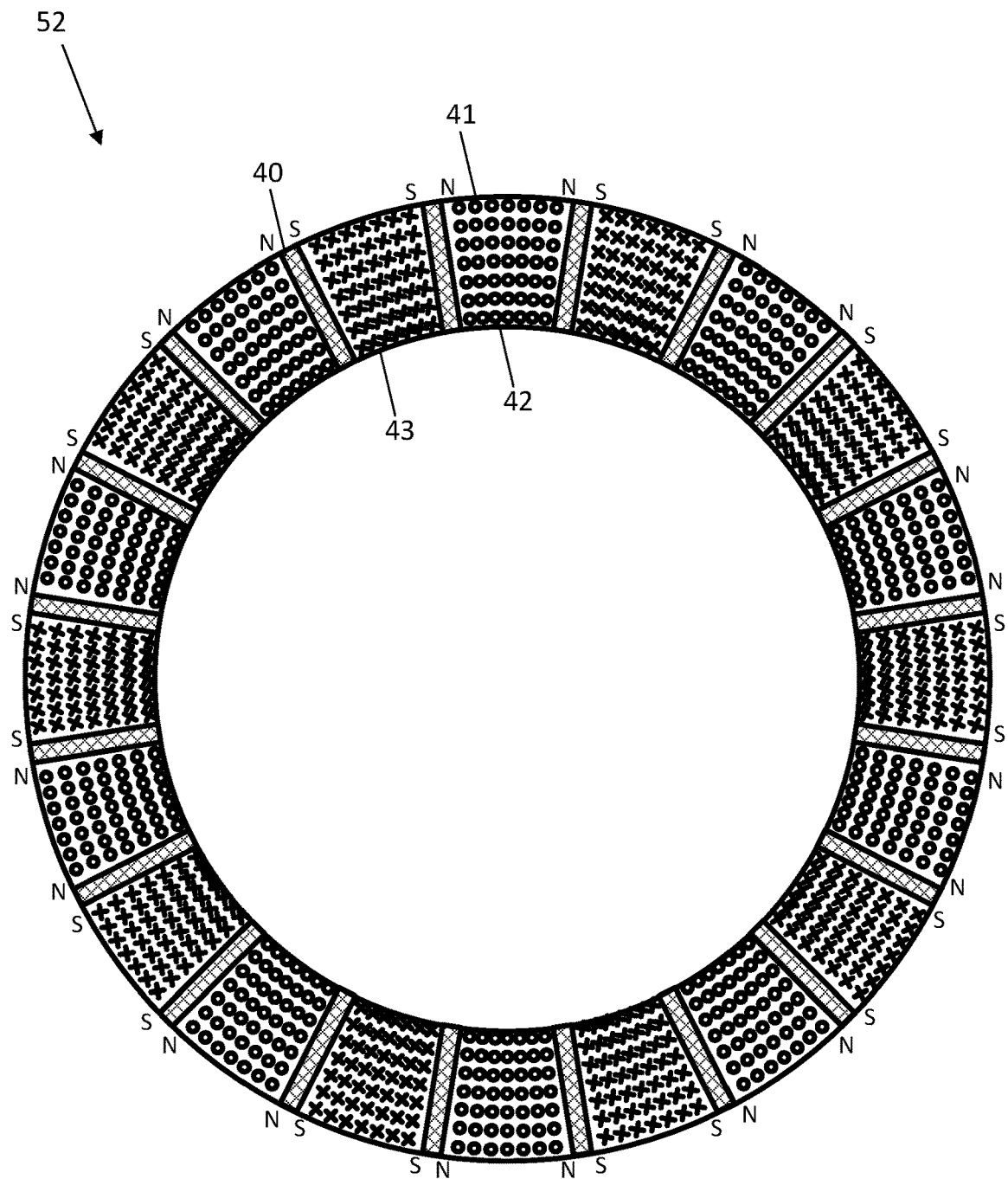
FIG. 11 illustrates another example radial arrangement of magnets for an electric machine with an axial air gap.
Figure 12:
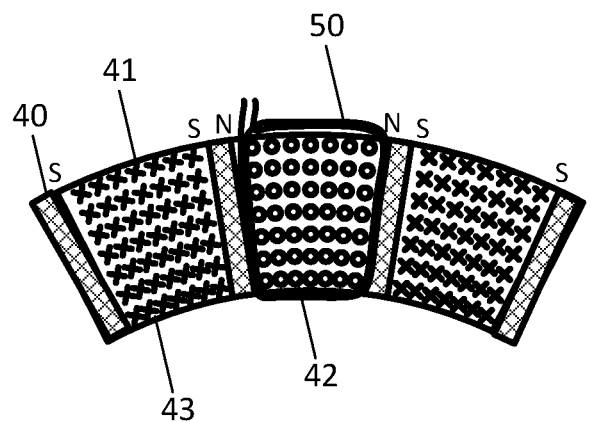
FIG. 12 illustrates an example coil for the electric machine with an axial air gap.

FIG. 11 illustrates another example radial arrangement of magnets 40 for an electric machine with an axial air gap. FIG. 12 illustrates an example coil 50 for the electric machine with an axial air gap. In the radial examples (e.g., FIGS. 5-10), the air gap between the rotor 22 and stator 27 is in the radial direction. That is the air gap is defined by the difference in radius between the rotor 22 and stator 27. FIGS. 11 and 12 illustrate an axial air gap. In the axial air gap machine the air gap machine the air gap is in the axial direction. With the stator 52 illustrated, the rotor is overlapping the stator 52 in a plane parallel to the page. FIG. 12 illustrates that the coil 50 of the rotor is in the plane above the stator 52.

The axial air gap machine includes magnets 40 arranged around the circumference of the stator 52. Each consecutive pair of magnets has like poles facing each other. Between each pair of like poles is a flux-shaping member 41. Flux flows from each of the N poles of the magnets 40 in the direction of out of the page, as shown by arrows 42, to the rotor. Flux returns from the rotor to the S poles of the magnets 40 in the direction of into the page, as shown by arrows 43.

An axial air gap machine may also have a ferrous material on the opposite side of the rotating windings. This ferrous material reduces the effective reluctance of the magnetic path by providing a high permeability path to complete the flux loop between the flux-producing poles on the first side of the air gap. While the ferrous material may be rotating, it may also be fixed, providing a second air gap on the opposite side of the rotating windings. This material may also include permanent magnets, oriented in a way to amplify their flux, or oriented in line with the expected flux direction.

Figure 13C:
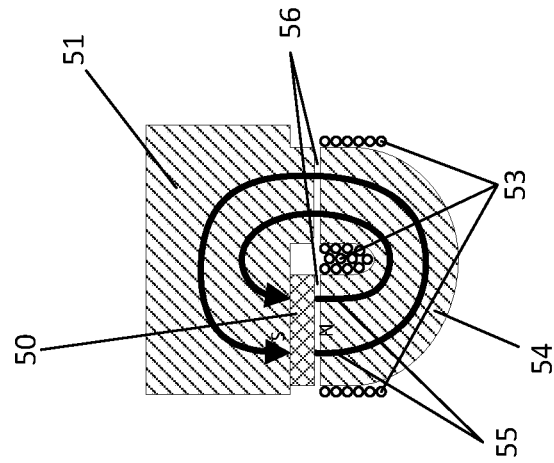
FIGS. 13A, 13B, and 13C illustrate a detailed view of adjacent magnets and a flux path.
Figure 13B:
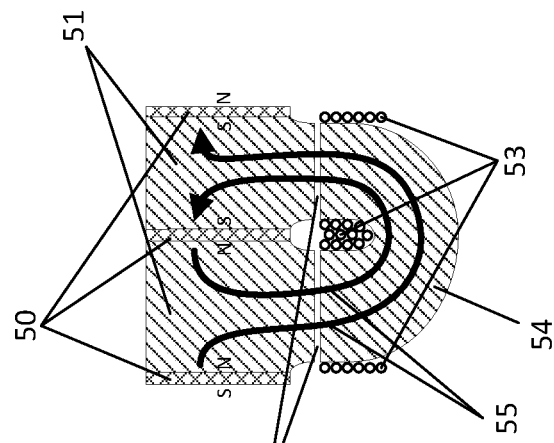
Figure 13A:
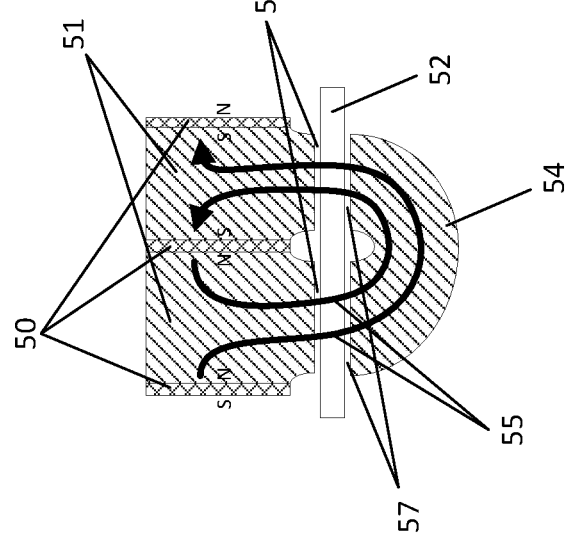

FIGS. 13A-C illustrate example ferrous material 54 placed on the opposite side of the rotating windings from the first air gap 56. The flux generated by the permanent magnets 50 and shaped by the flux-shaping members 51 passes through the ferrous material 54 along flux lines exemplified by flux lines 55. The ferrous material 54 may reduce losses due to leakage in a variety of machine topologies.

In FIG. 13A, the ferrous material 54 lies on the opposite side of a second air gap 57 from the rotating windings, illustrated as traces on a printed circuit board 52 which are also separated from the flux-shaping members 51 by a first air gap 56. The ferrous material 54 is stationary and is positioned so that the flux generated by the magnets 50 and passed through the flux-shaping members 51 flows through the ferrous material 54, reducing the reluctance of the magnetic path through the rotating coils on the printed circuit board 52, increasing the flux through the rotating coils.

In FIG. 13B, the ferrous material 54 lies on the opposite side of a first air gap 56 from the rotating windings, illustrated as coils 53. The ferrous material 54 rotates with the rotating coils 53 and is positioned so that the flux generated by the magnets 50, passed through the flux-shaping members 51 selectively flows through the ferrous material 54 when in alignment, reducing the reluctance of the magnetic path through the rotating coils 53, increasing the flux through the rotating coils.

While ferrous material 54 also provides a low reluctance path for magnetic flux, so it is reasonable to consider the ferrous material as a flux shaping member; the two names are separated for clarity.

In FIG. 13C, the ferrous material 54 lies on the opposite side of a first air gap 56 from the rotating windings, illustrated as coils 53. The magnet 50 generates a flux, illustrated by flux lines 55, which is shaped to flow through the ferrous material 54 and the coils 53 by the flux-shaping member 51. Nearby magnets 50 in this topology also add to the flux flowing through the flux shaping member 51. The ferrous material 54 rotates with the rotating coils 53 and is positioned so that the flux generated by the magnets 50. The ferrous material 54 may be configured to direct a single pole pair (e.g. north and south) as shown or may be configured to allow multiple pole pairs, similarly to the arrangement of the flux-shaping member 51.

FIG. 13C illustrates an alternative usage for flux-shaping members in a permanent magnet machine. In this topology, the number of permanent magnets is reduced from a design possessing repeated permanent magnets. Replacing the permanent magnet with ferrous material greatly reduces the leakage flux that would otherwise occur in the airgap if the magnet replaced by the flux-shaping member 51 were simply omitted. This topology offers no improvements in machine performance, but may result in notable cost savings by reducing the number of magnets 50 required by the design at a lower performance cost than machines that simply omit the magnet.

It should be noted that magnet sizing for the topology shown in FIG. 13A and FIG. 13B may also allow a machine to provide similar performance while reducing the necessary magnetic material. Because magnets 50 contribute flux to the flux-shaping members 51 on both sides of the magnet 50 and the flux from both magnets 50, the total magnetic material required to achieve a given flux density is still half the required material for the design shown in FIGS. 3 and 4.

Although ferrous material 54 is shown, embodiments are contemplated where permanent magnets 50 and flux-shaping members 51 exist on both sides of the rotating coil arrangement as illustrated by traces on printed circuit board 52 or coils 53. Such embodiments may improve flux density (e.g. 3.0 T) in the air gaps 56 and 57 as well as increasing machine performance. Such a topology, although contemplated, may have high costs of production, depending on the cost of magnetic material, or may not justify the increase in cost with corresponding performance improvements.

Figure 14C:
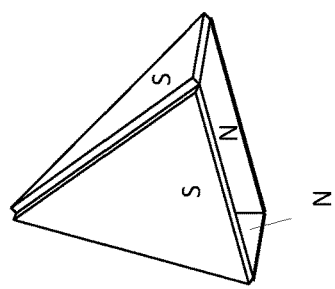
FIG. 14C illustrates yet another example arrangement of permanent magnets to provide increased magnetic flux at a single point.
Figure 14B:
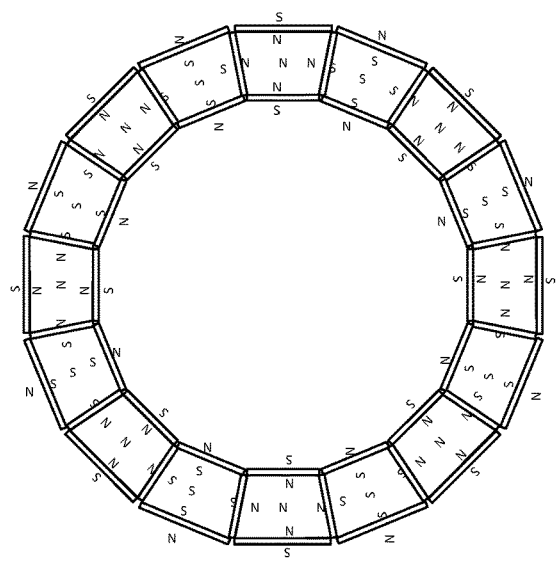
FIG. 14B illustrates an electrical machine formed by alternating poles.
Figure 14A:
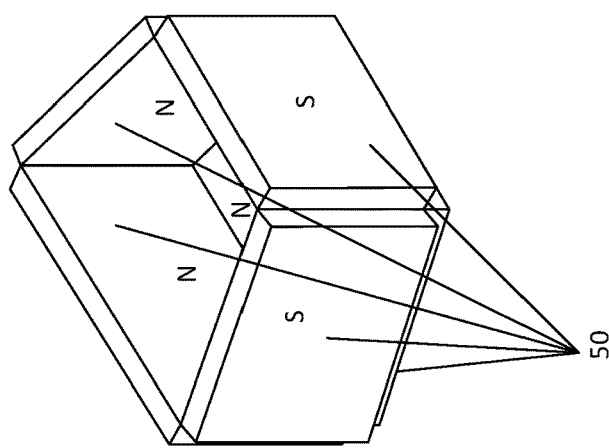
FIG. 14A illustrates an example arrangement of permanent magnets to shape flux.

FIGS. 14A-B illustrate an example electrical machine stator formed entirely of permanent magnets 50. Permanent magnets 50 provide all flux-shaping functions, while air conducts the magnetic flux. Because the machine does not rely on ferrous material to shape flux, the saturation flux density of the ferrous material is no longer a limiting factor in the flux shaping or concentrating. Although leakage flux increases significantly at high flux density levels, the electric machine dimensions may be significantly reduced at such high flux densities.

FIG. 14A illustrates an example arrangement of permanent magnets 50 to shape flux to approximately 3 times the flux level of the permanent magnets. Approximately three times may mean within a factor between 2.8 and 3.2. For example, 3.0 T may be achievable with 1.1 T neodymium rare-earth magnets. The north flux is concentrated in the center of this pole arrangement and exits through the open face. A similar arrangement, only with the magnets all reversed, would create a high density south pole in the electrical machine.

FIG. 14B illustrates an electrical machine formed by alternating poles, half configured as shown in FIG. 14A and half configured in the opposite manner. The electrical machine of FIG. 14B may be configured with high-permeability material placed around the outer and inner radius and behind the machine to provide a minimal flux shaping and to minimize flux fringe effects, but this material is not necessary to the design.

FIG. 14C illustrates yet another example arrangement of permanent magnets to provide increased magnetic flux at a single point. This configuration may be preferred in applications other than integration in an electrical machine because each magnet is not configured to be driving both a south and a north pole, but the achievable magnetic flux density is also very high for this topology. Aspects of these embodiments may be applied to other topologies in which the magnetization direction of all magnets is all focused to a common location.

Figure 15:
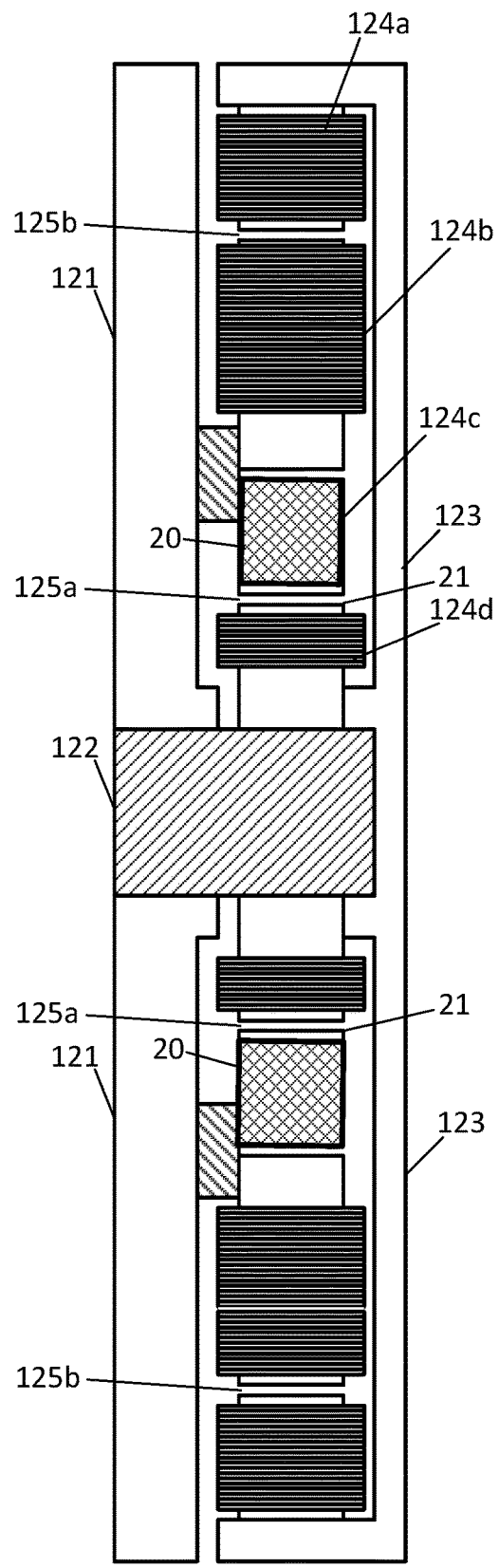
FIG. 15 illustrates a dual axis electric machine including a radial arrangement of magnets.

FIG. 15 illustrates a dual axis electric machine including a radial arrangement of magnets. The dual axis machine may be a generator or a motor. FIG. 15 illustrates a generator. A shaft 122 supports a rotor frame 123. A stator frame 121 is supported by a fixed member that provides the frame of reference for the rotating rotor. The fixed member may be an engine block or skid or other fixed member. The rotor frame 123 rotates with the shaft. The rotor frame 123 supports a rotor field device 124*a* and an exciter armature device 124*d*. Thus, the rotor field device 124*a* and the exciter armature device 124*d* may be rigidly mounted together or integrally formed. The stator frame 121 supports an exciter field device 124*c*, and a main stator device 124*b*. Thus, the exciter field device 124*c* and the main stator device 124*b* are rigidly mounted in the same frame of reference relative to the rotor or may be integrally formed. Either or both of the stator side and the rotor side may be formed of cast iron or steel or laminated silicon steel or other magnetically permeable materials.

An exciter air gap 125*a* is maintained between the exciter field device 124*c* and the exciter armature device 124*d*. The exciter field device 124*c* creates an exciter magnetic field in the exciter armature device 124*c* using permanent magnets 20 and flux-shaping elements 21. The exciter armature device 124*d* is configured to rotate with respect to the exciter field device 124*c* and impart a first time varying voltage in a set of coils in the exciter armature across the exciter air gap 125*a*. The permanent magnets 20 may have similar properties and structure to those described in other embodiments described herein.

A main air gap 125*b* is maintained between the rotor field device 124*a* and the main stator device 124*b*. The main stator device 124*b* including a second set of coils. The rotor field device 124*a* is configured to be energized by the first current in the first set of coils and generate a main magnetic field that imparts a second time varying voltage in the coils of the main stator device 124*b* across the main air gap 125*b*.

As illustrated in FIG. 15, the main stator device 124*b* and the exciter field device 124*c* lie in on a common plane normal to an axis of rotation of the shaft 122. In a one embodiment, only the main stator device 124*b* and the exciter field device 124*c* lie in on the common plane with the rotor field device 124*a* and the exciter armature device 124*d* lying in an adjacent plane. In this example, the adjacent plane including the rotor field device 124*a* and the exciter armature device 124*d* are axially spaced from the main stator device 124*b* and the exciter field device 124*c*. In this embodiment, the main air gap 125*b* and the exciter air gap 125*a* lie in adjacent planes or a common plane normal to the shaft. In another embodiment, the main stator device 124*b*, the exciter field device 124*c*, the rotor field device 124*a* and the exciter armature device 124*d* lie in the common plane. In this embodiment, the main air gap 125*b* and the exciter air gap 125*a* may be concentrically aligned parallel to the axis of the shaft 122 with all or part of the cylindrical exciter air gap 125*a* contained within the cylindrical main air gap 125*b*.

Figure 16:
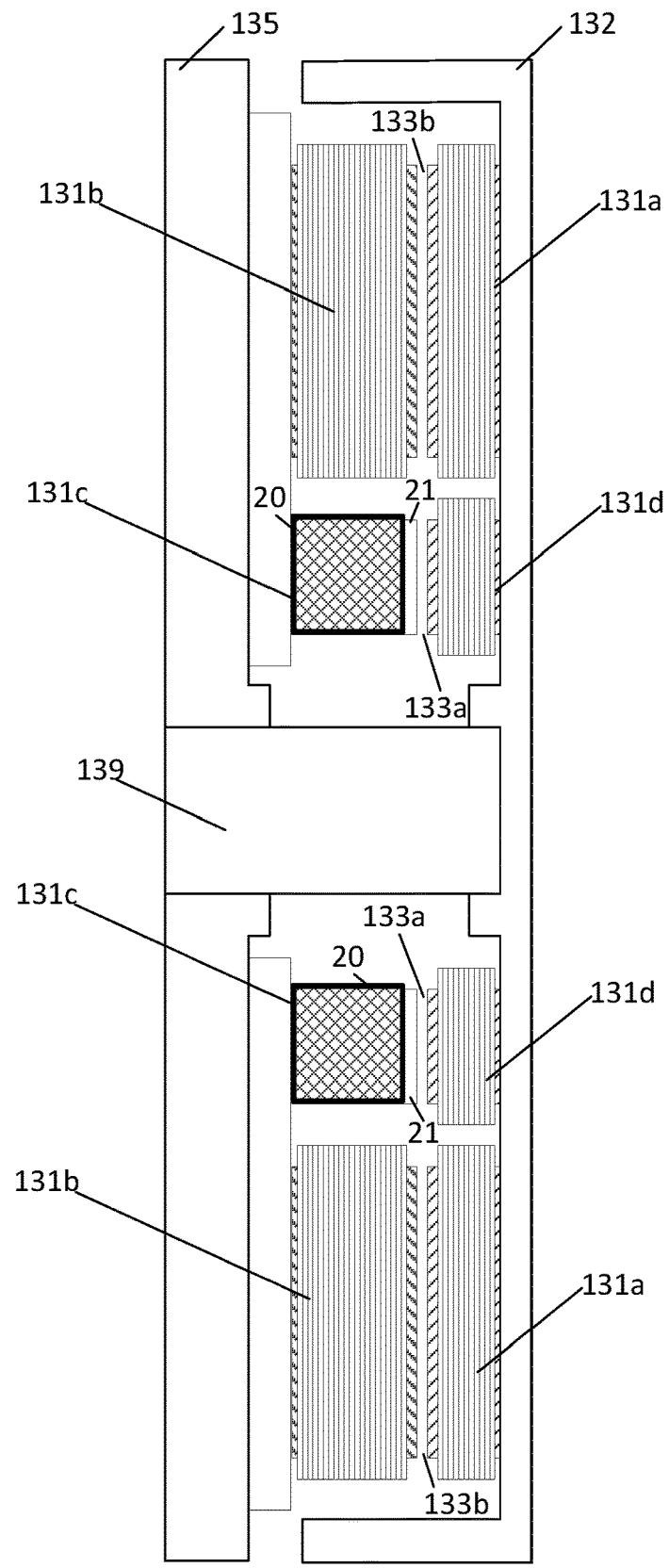
FIG. 16 illustrates a dual axis electric machine including a radial arrangement of magnets for an axial air gap.

FIG. 16 illustrates a dual axis electric machine including a radial arrangement of magnets for an axial air gap. The dual axis machine may be a generator or a motor. FIG. 16 illustrates a generator. The axial dual axis generator includes a stator frame 135 and a rotor frame 132. A shaft 139 supports the rotor frame 132. The stator frame 135 is attached to a fixed member. The rotor frame 132 rotates with the shaft 139. The rotor frame 132 supports a rotor field device 131*a* and an exciter armature device 131*d*. Thus, the rotor field device 131*a* and the exciter armature device 131*d* may be rigidly mounted together or integrally formed.

The stator frame 135 supports an exciter field device 131*c* and a main stator device 131*b*. Thus, the exciter field device 131*c* and the main stator device 131*b* are rigidly mounted together or integrally formed. Either or both of the stator side and the rotor side may be formed of cast iron, annealed iron, silicon steel or another magnetically permeable material. The coils may be wrapped on the iron, or, in an alternative embodiment, the coils may be integrated in a printed circuit board.

An exciter air gap 133*a* is maintained between the exciter field device 131*c* and the exciter armature device 131*d*. The exciter field device 131*c* generates an exciter magnetic field in the exciter air gap 133*a*. The exciter field device 131*c* may include permanent magnets 20 and flux-shaping elements 21, having similar properties and structure described in earlier embodiments. The exciter field device may include only permanent magnets 20, arranged to produce amplified flux.

Alternatively or in addition, the stationary permanent magnets may be included in other arrangements anticipated by the behavior described herein; such that the magnet placement provides amplification of the magnetic flux between the stationary element and the rotating element of the electric machine. This magnetic flux may be shaped through ferrous material, such as iron, nickel, cobalt and their derivatives or produced in the air gap directly.

The exciter armature device 131*d* is configured to rotate with respect to the exciter field device 131*c* and impart a first time varying voltage in a set of coils on the opposite side of the exciter air gap 133*a* from the exciter field device.

A main air gap 133*b* is maintained between the rotor field device 133*a* and the main stator device 131*b*. The main stator device 131*b* includes a second set of coils. The rotor field device 131*a* is configured to be energized by the first current in the first set of coils and generate a main magnetic field that imparts a second time varying voltage on the main stator device 131*b* at the main air gap 133*b*.

Figure 17:
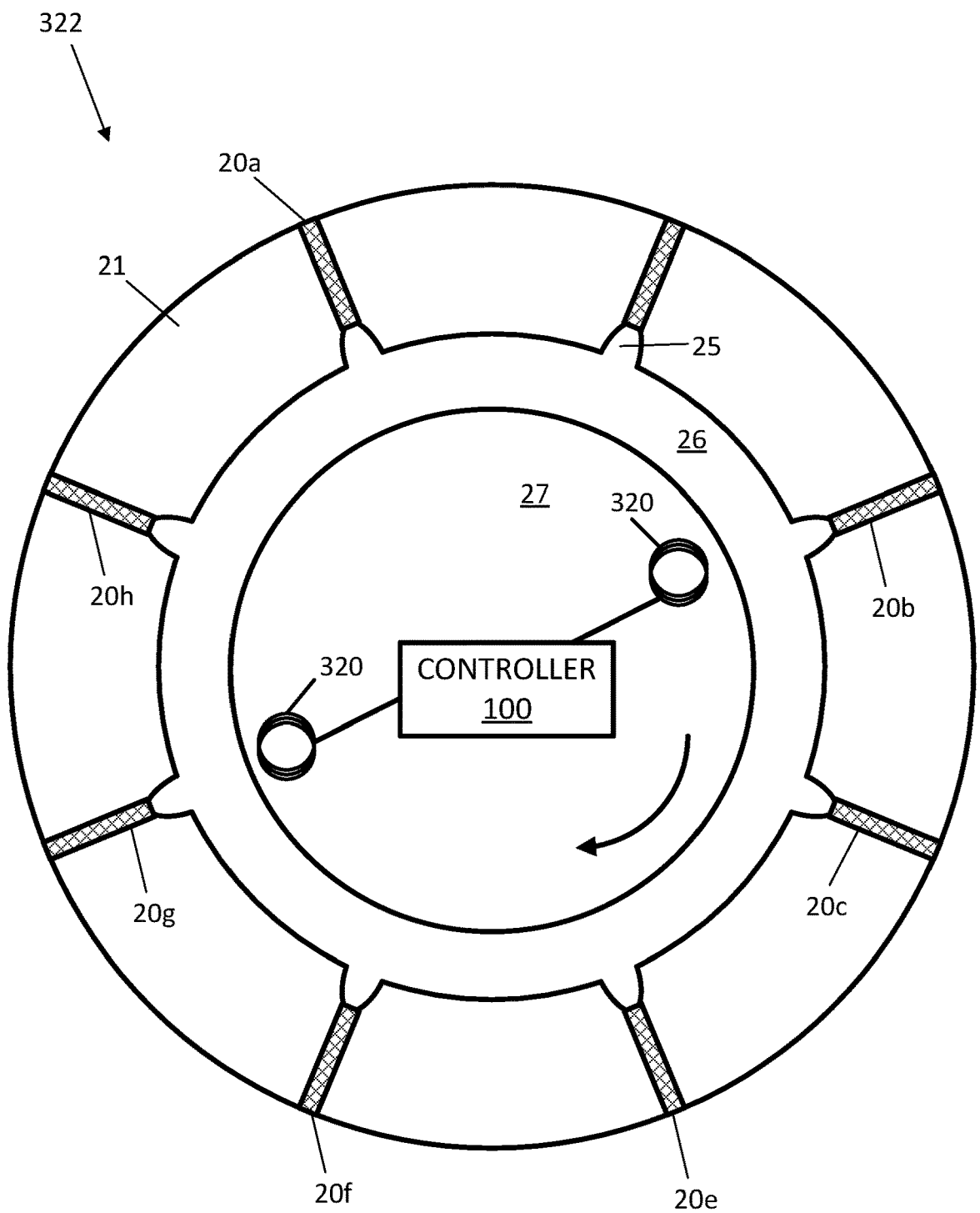
FIG. 17 illustrates an example electric machine including a flux sensor.

While the illustrations contained herein represent a specific embodiment of the invention, embodiments are contemplated wherein the flux in the electric machine may increase more than 50%. Such applications may include flux shaping elements or utilize only permanent magnets to shape the flux using the coercivity of the permanent magnets to concentrate the magnetic flux in a region. In these applications, the flux in the electric machine may be amplified by a larger number (e.g. 300% increase). While such embodiments are contemplated, the use of ferrous material to shape the magnetic flux in such an application provides little advantage due to the saturation flux of the ferrous material, thus the topology of such a system would differ notably from the illustrations provided herein. FIG. 17 illustrates another example embodiment of an electric machine as described in previous embodiments. The magnets 20*a-h* are arranged around the rotor 27. The rotor 27 may include a controller 100 and one or more sensors 320. The controller 100 may be configured to perform one or more generator control functions such as a modification of the output of the generator or exciter, a load balancing function, a load shedding function, and a paralleling function, which are described in more detail below. In addition, the controller 100 may modify the operation of the rotor 27 in response to the data collected by sensors 320. Additional, different, or fewer components may be included.

The sensors 320 may include a pickup coil. The pickup coil generates an electric current in response to the pickup coil being placed in a magnetic field. The magnitude of the electric current may be proportional to magnet field, or otherwise fluctuate in response to the magnetic field. As the pickup coil rotates in the vicinity of magnets 20, the induced current or impressed voltage on the pickup coil changes. The current or voltage may increase as the pickup coil moves closer to one of the magnets 20 and decrease as the pickup closer moves away from the magnet 20. The controller 100 may receive the induced current, or data indicative of the current, from the pickup coil and analyze one or more operating characteristics of the rotor. The operating characteristics of the rotor may be the speed of the rotor, the position of the rotor, or wobble of the rotor.

The term wobble may refer to how centered the rotor 27 is with respect to the magnets 20. The term wobble may refer to being inclined more to one side than the other. The wobble may be measured in radial direction or an axial direction. When one side of the rotor 27 is closer to the magnets 20 than another side of the rotor 27, the rotor 27 is wobbling in the radial direction. When one side of the rotor 27 is displaced more in a direction perpendicular to the direction of rotation, the rotor 27 is wobbling in the axial direction.

Figure 18A:
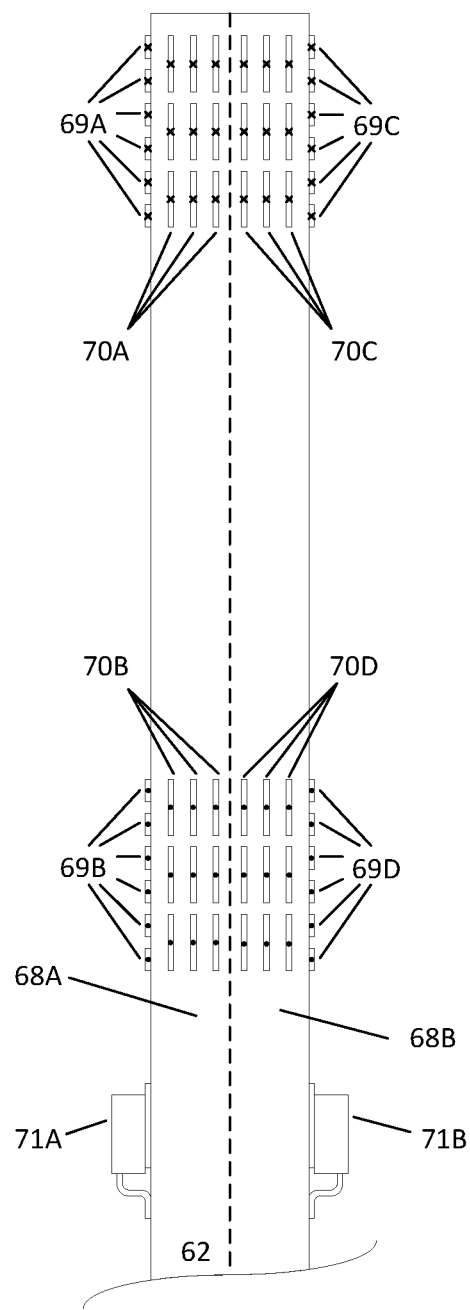
FIG. 18A illustrates a cross section of an example printed circuit board containing two windings.
Figure 20:
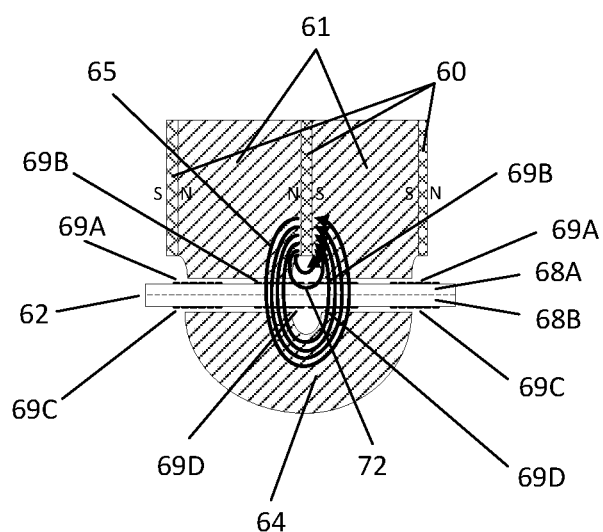
FIG. 20 illustrates an example top view of a portion of an electrical machine.

In addition, the position of the rotor 27 may be determined based on a difference between signals produced by coils at opposite sides of the rotor 27 as illustrated in FIG. 18A because the magnetic flux characteristics vary with distance from the poles due to leakage paths such as partially coupled leakage path 72 in FIG. 20. If the winding represented by bottom traces 69C and 69D and internal traces 70C and 70D produces a different signal than expected based on the signal from the winding represented by top traces 69A and 69B and internal traces 70A and 70B, the rotor is not centered in the slot. The deviation may be determined by the direction, phase or amplitude of the difference.

Figure 18B:
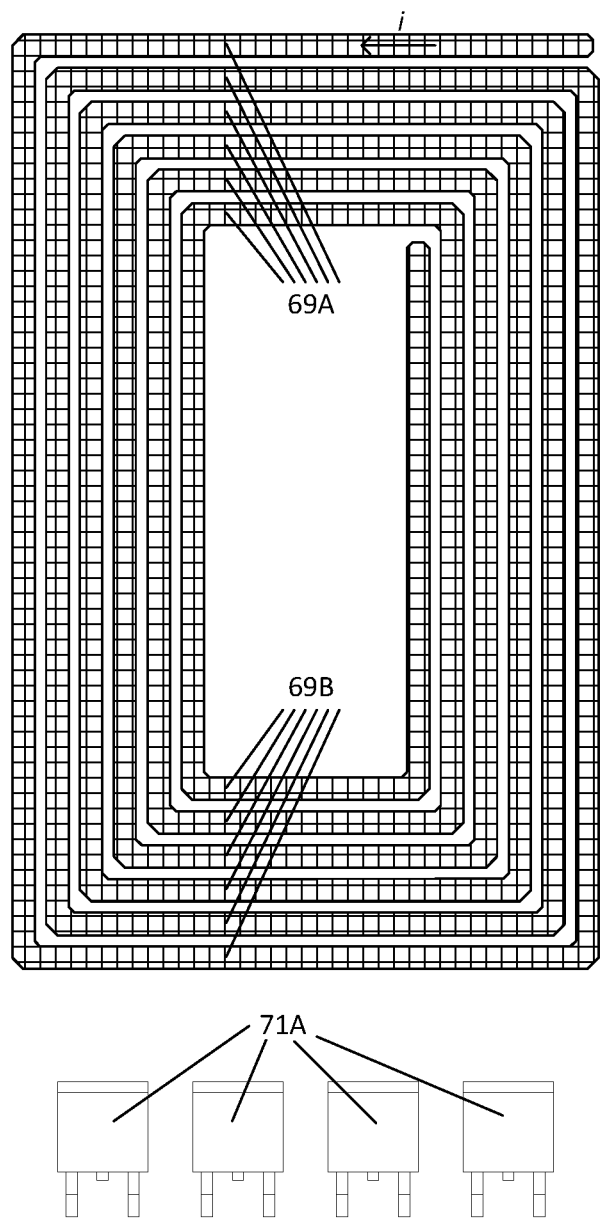
FIG. 18B illustrates outer and inner circumferential portions of a closed winding on the face of the printed circuit board of FIG. 18A.

FIG. 18A illustrates a cross section of an example printed circuit board 62 containing two windings. The first winding is comprised of top traces with current entering the page 69A, top traces with current leaving the page 69B, top side internal traces with current entering the page 70A and top side internal traces with current leaving the page 70B. These traces describe the outer and inner circumferential portion of a closed winding on the face of the printed circuit board 62 as shown in FIG. 18B. The top side internal traces 70A and 70B are oriented similarly to the top traces 69A-B but there may be fewer, larger traces for thermal considerations. 70A-D include all 9 internal traces shown for each group, even though only three are indicated by arrows.

FIGS. 18A-B illustrate switching components 71A-B, such as but not limited to insulated gate bipolar transistors, field effect transistors, silicon controlled rectifiers, which selectively couple the windings 69A-D and 70A-D to the rotating field winding of the electrical machine. This selective coupling allows control of the voltage applied to the rotating field of the alternator as well controlling which side of the printed circuit board 62 has current flowing through it. Windings 69A-B and 70A-B are positioned on the top half 68A of the printed circuit board 62, while windings 69C-D and 70C-D are positioned on the bottom half 68B of the printed circuit board 62.

Figure 19:
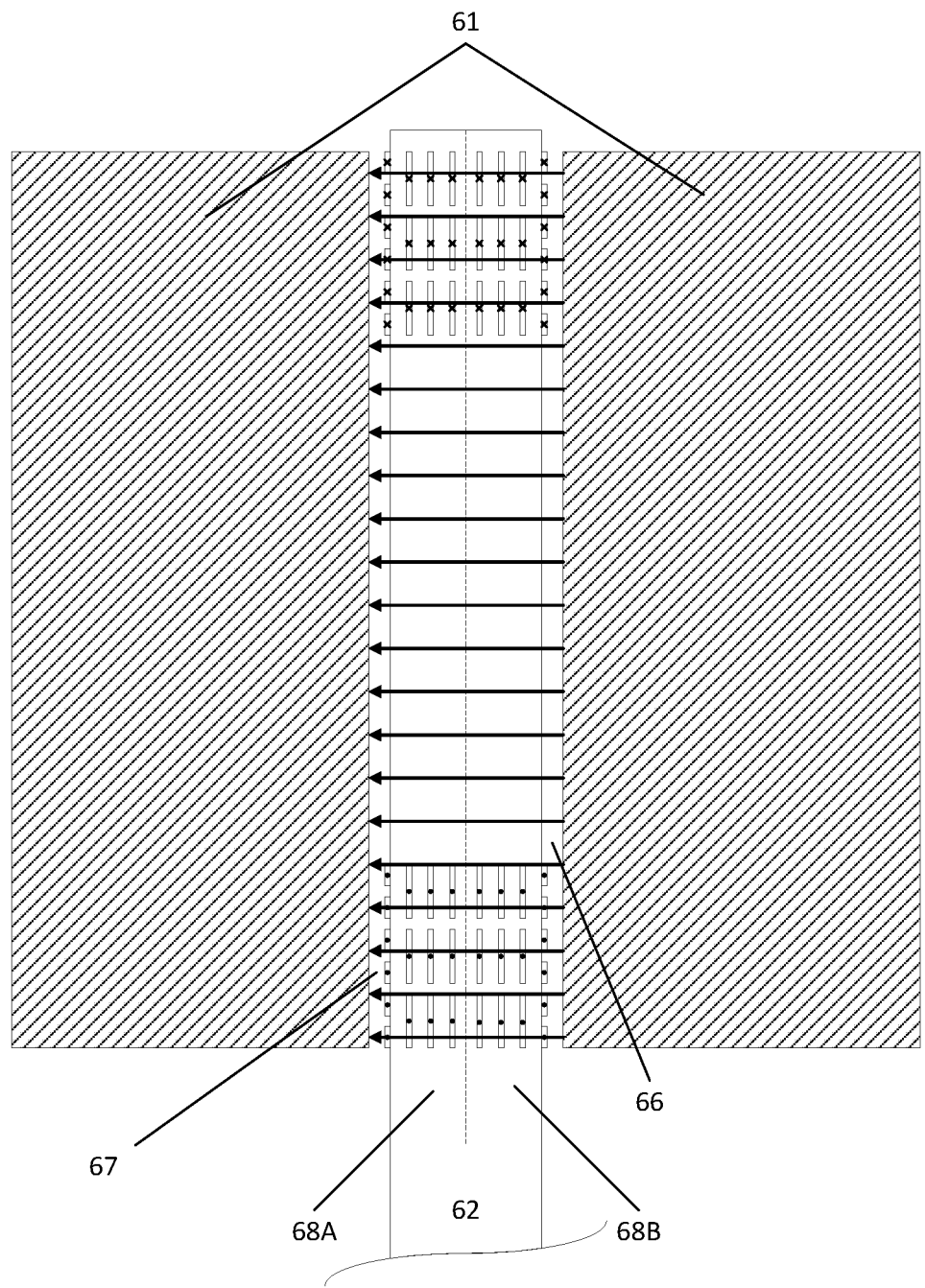
FIG. 19 illustrates an axial cross-section of an example printed circuit board positioned between two flux-shaping members.

FIG. 19 illustrates an axial cross-section of an example printed circuit board 62 positioned between two flux-shaping members 61. The printed circuit board 62 contains a top half 68A and a bottom half 68B, laminated together as part of the printed circuit board 62 assembly. The magnetic flux flows from one flux-shaping member 61, through the first air gap 66, through the printed circuit board 62, through the second air gap 67, and into the other flux-shaping member 61. The magnetic flux flowing through the printed circuit board 62 also flows through the windings illustrated as traces on the printed circuit board 62.

In FIG. 19, the printed circuit board is configured to rotate with the rotor of the electrical machine, while the flux-shaping members 61 and configured to remain stationary relative to the rotation of the electrical machine. The printed circuit board 62 rotates such that the cross section would move into or out of the page, depending on the direction of rotation of the electrical machine. When the printed circuit board 62 rotates through the flux passing from one flux-shaping member 61 to the other flux-shaping member 61, a voltage is induced in the traces on the board comprising windings.

FIG. 20 illustrates an example top view of a portion of an electrical machine containing flux-shaping members 61, permanent magnets 60 and a printed circuit board 62 containing traces 69A-B and 70A-B comprising windings on a top half 68A of the printed circuit board 62 and traces 69C-D and 70C-D comprising windings on a top half 68B of the printed circuit board 62. Magnetic flux generated by magnets 60 follows flux lines 65 through a first flux-shaping members 61, through the printed circuit board 62, through a ferrous material 64, through the printed circuit board 62 in the opposite direction, through a second flux-shaping member, and back into the magnets 60. Note: Not all flux from the magnets 60 through the flux-shaping members 61 and the ferrous material 64 is represented by flux lines 65 in FIG. 20 to retain drawing clarity.

Not all flux from the magnets 60 follows flux lines 65. Some flux from the magnets 60 follows leakage paths, such as partially coupled leakage path 72. Flux following partially coupled leakage path 72 may pass through some of the windings comprised by traces on the printed circuit board 62, but not all of the windings comprised by traces 69A-D on the printed circuit board 62. For example, partially coupled leakage path 72 may pass through only the windings comprised by traces 69A-B on the top half 68A of the printed circuit board 62.

Flux passing through only some of the windings on the printed circuit board 62 may generate a voltage in those windings without generating voltage in the other windings. For example, partially coupled flux path 72 may generate a voltage in windings comprised of traces 69A-B on the top half 68A of the printed circuit board 62 without generating a voltage in the windings comprised of traces 69C-D on the bottom half 68B of the printed circuit board 62. This may create a difference in the electrical characteristics, such as a current, voltage or power, measured from the top half 68A and the bottom half 68B.

As the printed circuit board 62 moves closer to the flux-shaping members 61 and further from the ferrous material 64, more of the partially coupled leakage path 72 may be included through the winding comprised of traces 69A-D of the printed circuit board 62. Changing the flux through the printed circuit board 62 may change the characteristics of the signal generated on the windings comprised of traces 69A-D, such as voltage, current, wave shape, power, etc. A predictable change in the signal characteristics may allow determination of the position of the printed circuit board 62 relative to the flux-shaping members 61 and the ferrous material 64.

While the example embodiment shows the rotating windings comprised of traces on a printed circuit board, embodiments are contemplated where the windings are comprised of electrically conductive material wound into coils, potentially around ferrous or other high-permeability material. While the construction of such an embodiment is noticeably different, the signal detection and control behavior remains very similar to that of the printed circuit board example.

Figure 21A:
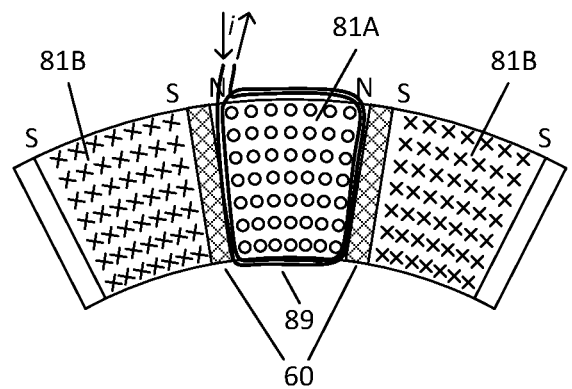
FIG. 21A illustrates a first position of a current-carrying coil relative to a magnetic flux.
Figure 21B:
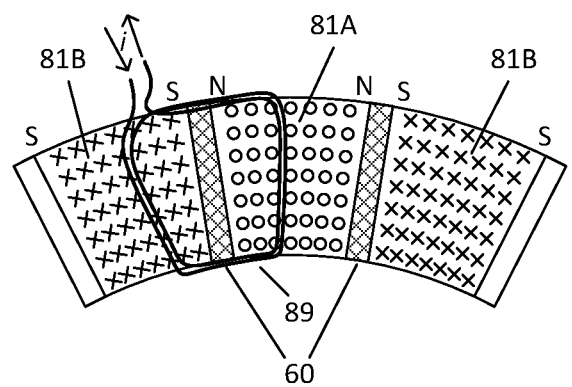
FIG. 21B illustrates a second position of a current-carrying coil relative to a magnetic flux.

FIGS. 21A-B illustrates two different positions of a current-carrying coil 89 relative to a magnetic flux produced by magnets 80 and concentrated through flux-shaping members 81A-B. The positions are representative of different moments in time as the current carrying coil 89 rotates relative to the magnets 80 and the flux-shaping members 81A-B.

In FIG. 21A, positive current applied to the current-carrying coil 89 may result in attractive force toward the north flux-shaping member 81A due to the orientation of the current relative to the flux. Reversing the current on the current-carrying coil 89 may result in a repelling force from the north flux-shaping member 81A due to the orientation of the current relative to the flux.

In FIG. 21B, positive current applied to the current-carrying coil 89 may result in attractive force toward the north flux-shaping member 81A and repelling force relative to south flux-shaping member 81B due to the orientation of the current relative to the flux. Reversing the current on the current-carrying coil 89 results in a repelling force from the north flux-shaping member 81A and attracting force relative to south flux-shaping member 81B due to the orientation of the current relative to the flux.

If the area of the current-carrying coil 89 encompassing flux from the north flux-shaping member 81A is identical to the area of the current-carrying coil 89 encompassing flux from the south flux-shaping member 81B, the net axial force on the coil may be 0 due to cancellation of the two forces. This condition occurs when the rate of change of the magnetic flux is at a maximum, therefore the voltage induced on the current-carrying coil is at a maximum. For this reason, purely resistive load (where the current aligns with the voltage) results in no net axial force on the rotor of the electrical machine.

Current leading voltage means that the maximum current may occur before the voltage reaches a maximum, while current lagging voltage means that the maximum current may occur after the voltage reaches a maximum. If the current leads the voltage, the machine may experience a general repelling force. If the current lags the voltage, the machine may experience a general attracting force.

Referring to FIG. 19 for further analysis of forces on the rotor, an attractive force on windings located on the top half 68A of the printed circuit board 62 operates in an opposite direction to an attractive force on windings located on the bottom half 68B of the printed circuit board 62. If the currents are equal, the windings are identical, and the magnetic flux is truly uniform, the forces may be equal, providing no net force on the rotor. The case of repelling force is similar, providing no net force if all factors are equal.

In practice, the magnetic flux is stronger near the flux-shaping members and weaker in the center of the air gap due to leakage. For this reason, shifting the rotor closer to the left side may cause coils on the top half 68A of the printed circuit board 62 to have more attractive or repelling force than coils on the bottom half 68B of the printed circuit board 62 with identical current flowing through the coils.

If the force generated by the coils is repelling (leading current), the rotor may naturally repel away from the side closest to it while maintaining equal current on both halves 68A-B of the printed circuit board 62. If the force generated by the coils is attracting (lagging current), the rotor may naturally pull toward the side closest to it while maintaining equal current on both halves 68A-B of the printed circuit board 62. In the leading current case, there may be no need for intentional control of the board position due to self-correction. In the lagging current case, dynamic control may be required to prevent the rotor (printed circuit board 62) from making contact with the stator (flux-shaping members 61).

One technique for controlling the rotor position involves individual control of the current through the windings on the top half 68A of the printed circuit board 62 and the current through the windings on the bottom half 68B of the printed circuit board 62. Individual current control may involve any of the following: controlling the relationship of current to position (leading/lagging) on opposite sides, controlling the amplitude of the current on opposite sides, controlling which side sources the current to the rotating alternator field, or other similar means of providing net force to the rotor.

Figure 22:
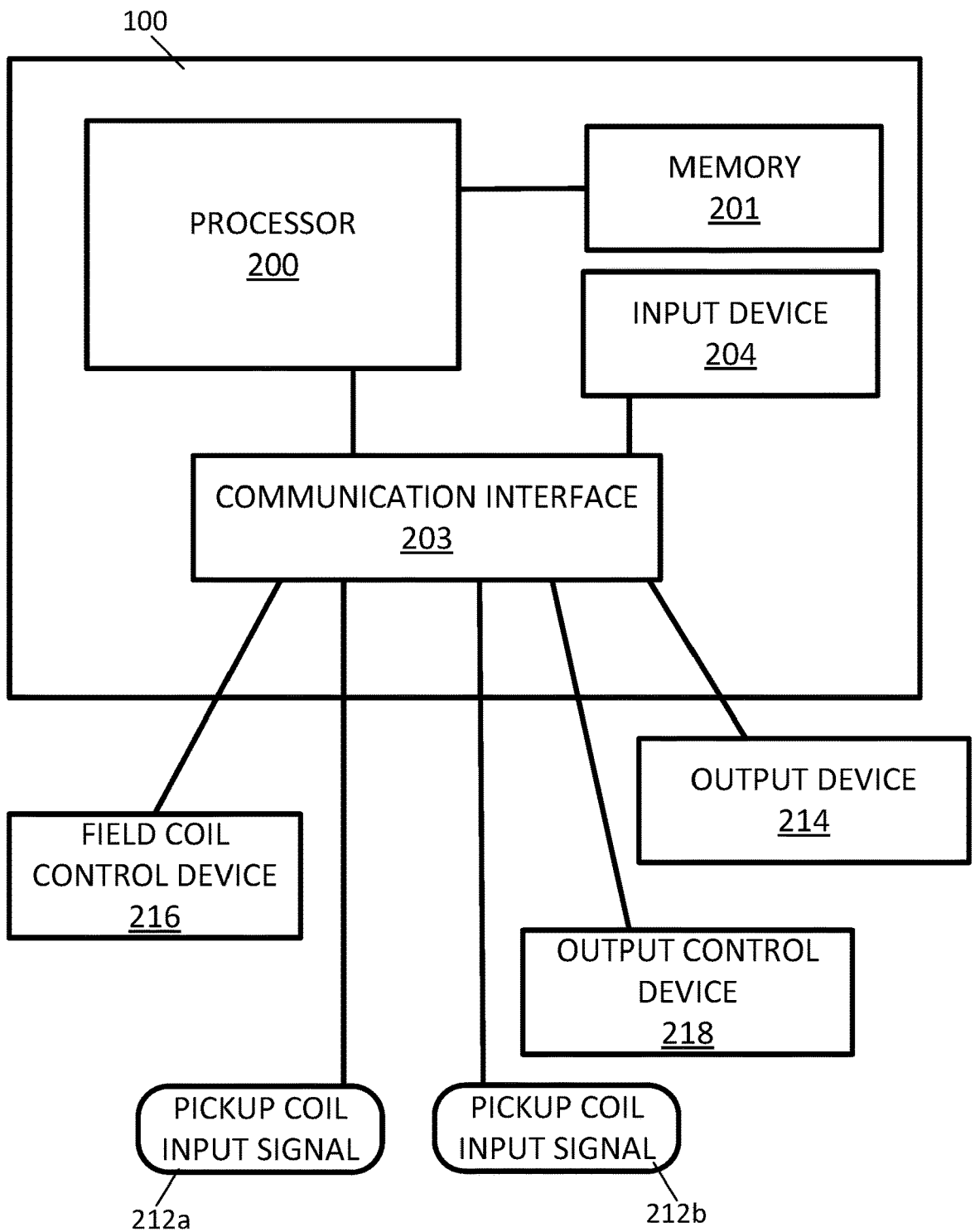
FIG. 22 illustrates an example electric machine controller.
Figure 23:
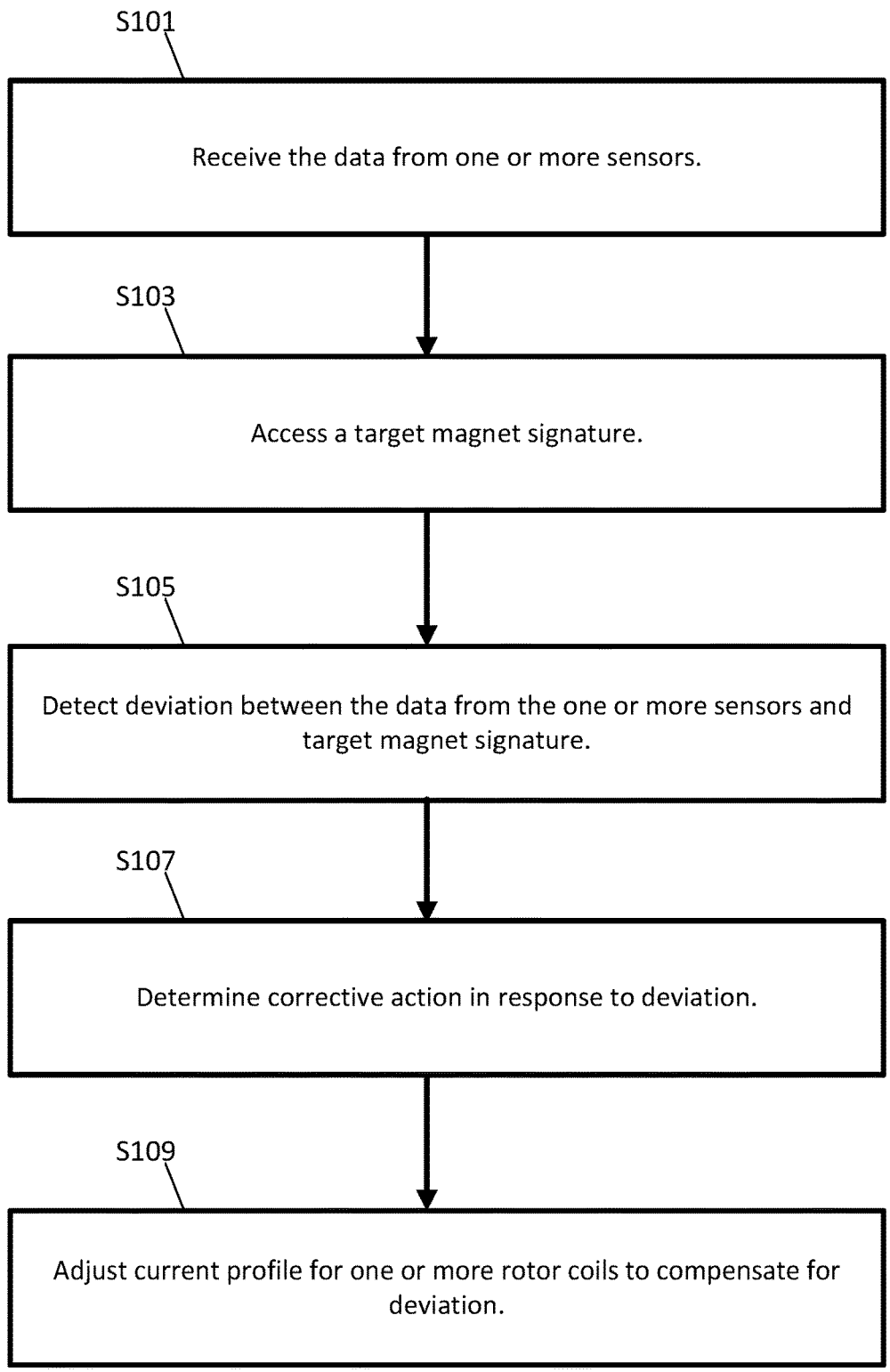
FIG. 23 illustrates an example flowchart for operation of the controller of FIG. 22.

FIG. 22 illustrates an example controller 100. The controller may include a processor 200, a memory 201, and a communication interface 203. The communication interface 203 may communicate with pickup coil input signals 212a and 212b, which may correspond to the sensors 320, an output device 214, an input device 204, a field coil control device 216, and an output control device 218. Additional, different, or fewer components may be included. FIG. 23 illustrates an example flowchart for operation of the controller of FIG. 22 for dynamically controlling the position of the rotor 27. Additional, different, or fewer acts may be included.

At act S101, the controller 100 receives the data from one or more sensors. For example, the communication interface 203 may receive data from the pickup coil input signal 212a and/or 212b. The data may describe a current in the magnetic sensor. Another type of inductance sensor may be used. The data may describe magnetic fringing of the magnetic flux that escapes between any two adjacent magnets. The data may describe the change in flux over time (e.g., d(flux)/dt). The communication interface 203 is an example means for receiving data from one or more sensors.

At act S103, the controller 100 or the processor 200 may access a target magnet signature from memory 201. The target magnet signature may be a target value, a time sequence of target values, or a position sequence of target values. The target value may be the expected value (e.g., expected average) from the pickup coil input signal 212a and/or 212b.

The time sequence of target values may be a series of target values that are sequenced in time. The series of values may be expected values for the pickup coil input signal 212a and/or 212b as one of the pickup coils passes one of the magnets 20a-h. The time sequence of target values may have a ramping up portion that corresponds to the pickup coil approaching one of the magnets 20a-h and a ramping down portion that corresponds to the pickup coil traveling away from one of the magnets 20a-h.

The position sequence signature of target values may correspond to the position of the magnets 20a-h. The position sequence signature may include a first target value for magnet 20a, a second target value for magnet 20b, and so on. The controller 100 may synchronize the values of the position sequence signature according to the rotational position of the rotor 27. For example, a position sensor may determine the axial position of the rotor or a shaft of the rotor as well as the rotational position of the rotor or a shaft of the rotor. In another example, the rotational position of the rotor may be used in the calculation of the axial position or even in the control of the axial position of the rotor.

The target magnet signature may be determined based on historical data from the pickup coil input signal 212a and/or 212b. For example, the controller 100 may generate the time sequence of target values or the position sequence of target values based on previous values detected by the pickup coil input signal 212a and/or 212b. The target magnet signature may be a running average over a predetermined number of rotations of the rotor 27 (e.g., a running average over 1000 rotations). The target magnet signature may be based on all recorded values (e.g., an overall average).

The processor 200 may include a module or may be apportioned to include an application specific controller or integrated circuit as a means for accessing a target magnet signature from memory 201. The memory 201 may be a means for storing the target magnet signature.

At act S105, the controller 100 detects deviation between the data from the one or more sensors and target magnet signature. For example, the processor 200 may compare the outputs of the sensors 320 to the target magnet signature. The deviation may be compared to a predetermined value or range of values to determine whether or how much the data deviates from the target magnet signature.

Alternatively, the processor 200 may compare the pickup coil input signal 212a to the other pickup coil input signal 212b. The sensors 320 may be aligned such that rotate closest to the magnets 20a-h at the same time. When one of the sensors 320 has an induced current that is more than a threshold amount greater than the other one of the sensors 320, the controller 100 may determine that the rotor is axially off-center.

The controller 100 may analyze the output of one or more of the sensors 320 over time. A rotor 27 that is substantially centered between the magnets 20a-h should output a repeating pattern in the induced current or impressed voltage. For each revolution, the output may include a peak for each of the magnets 20a-h. The controller 100 may determine an average of the maximum or peak values. When one of the peaks deviates from the average by more than a threshold amount or threshold percentage, the controller 100 may determine that the rotor 27 is substantially out of center. The term substantially out of center may be mean the rotor 27 is more than a threshold distance closer to the closest one of magnets 20a-h than to the farthest one of the magnets 20a-h.

The processor 200 may include a module or may be apportioned to include an application specific controller or integrated circuit as a means for detecting deviation between the data from the one or more sensors and target magnet signature.

At act S107, the controller 100 determines a corrective action in response to the deviation. When the deviation is less than the predetermined threshold, the corrective action may be nothing (i.e., no action). When the deviation exceeds, the predetermined threshold, the corrective action may be an adjustment to the rotation of the rotor 27. The adjustment may be the speed of the rotor 27. The adjustment may be the position of the rotor 27 in a specified direction.

The processor 200 may include a module or may be apportioned to include an application specific controller or integrated circuit as a means for determining a corrective action in response to the deviation.

At act S109, the controller 100 may adjust a current profile for one or more rotor coils to compensate for deviation. The controller 100 may instruct a field current control device 216 to adjust a current flowing through the rotor coils. The rotor coils are the coils generate a current for an output of the generator. When more current is applied to a coil on one side of the rotor 27, the rotor 27 is more attracted to magnets on that side of the rotor 27, which displaces or pull the rotor 27 in that direction. Therefore, the position of the rotor 27 is adjusted by controlling the current through the rotor coils. The processor 200 may include a module or may be apportioned to include an application specific controller or integrated circuit as a means for adjusting a current profile for one or more rotor coils to compensate for deviation.

The field current control device 216 activates or deactivates certain rotor coils in order to adjust the position of the rotor 27. In one example, the rotor 27 may be divided into sectors. The rotor 27 may be kept flat, or resonance reduced, by controlling the current to one or more sectors. The resonance, or slot order resonance, is a force that causes the rotor 27 to vibrate in and out.

In one example, the air gap between the rotor 27 and the stator is minimized by controlling the current to the field coils. For example, a smaller air gap may be used because deviations in the rotation of the rotor 27 can be controlled using the field current control device 216 to accurately position the rotor 27. In addition, a coating may be added to the magnets 20a-h or the rotor 27 to protect against accidental contract between the magnets 20a-h and the rotor 27.

Additional functions of the controller 100 may include modification of the output of the generator or exciter, a load balancing function, a load shedding function, and a paralleling function.

The controller 100 may receive data indicative of the output of the generator or exciter. The output may be derived from an induction value produced by sensor 320. The output may be detected by another sensor (e.g., a voltage or current sensor at the output of the generator) and communicated to the controller 100. The controller 100 may modify the output of the exciter or the output of the generator. For example, the controller 100 may control the output of the exciter based on a target value. When the output exceeds the threshold level, the controller 100 may modify a target value for the generator in response to the output exceeding the threshold level.

The controller 100 may perform load balancing or load shedding in response the detected output of the exciter or generator. The controller 100 may generate a load balance command based on the output that brings more or less load to the generator. The controller 100 may generate a command for a switch that adds or removes a load from the generator. Alternatively, the load balance command may be sent to another generator in a set of parallel generators to adjust the output of the generators in order to equalize or configure the load among the generators. In one example, the loads are balanced across generators by increasing or decreasing the rate that fuel is supplied to the engines. The fuel adjustment may change the real power supplied by the generators. In one example, the loads are balanced among generators by modifying the current levels supplied to the alternator field windings.

The controller 100 may perform a paralleling function in response to the output of the generator or the exciter. For example, when the load is above a threshold the controller 100 may generate a paralleling signal. The paralleling signal may include an instruction to bring an additional generator online. The instruction may cause a generator to close to the bus or begin running. The paralleling signal may include a time value in order to synchronize the generators.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An electric machine comprising:
   a stator including a plurality of magnetic poles;
   a rotor containing rotor windings and configured to rotate relative to the stator and spaced from the stator by an air gap; and
   a plurality of magnets rigidly mounted to a plurality of flux-shaping members of the stator,
   wherein the plurality of magnets includes a first magnet configured to contribute flux to a first electromagnetic pole of the electrical machine and includes a second magnet configured to contribute flux to the first electromagnetic pole of the electrical machine,
   wherein a flux path for the first magnet passes through the first electromagnetic pole of the electrical machine and a second electromagnetic pole of the electric machine,
   wherein the rotor windings are formed as traces on a printed circuit board and the printed circuit board also contains control circuitry to control an excitation current to a controlled field alternator.

2. The electric machine of claim 1, wherein the flux path for the first magnet passes through only the first magnet of the plurality of magnets, and wherein the first magnet and the second magnet contribute a respective flux to the first electromagnetic pole of the electric machine.

3. The electric machine of claim 1, wherein the plurality of magnets have a first magnetic permeability and the plurality of flux-shaping members having a second magnetic permeability;
   wherein the flux from the plurality of magnets is shaped through the flux-shaping members having the second magnetic permeability, wherein the second magnetic permeability is higher than the first magnetic permeability.

4. The electric machine of claim 1, wherein the stator has a circular shape that includes an alternating sequence of the plurality of magnets and the plurality of flux-shaping members.

5. The electric machine of claim 1, wherein at least one of the plurality of flux-shaping members includes an internal face having a curvature substantially parallel to the rotor.

6. The electric machine of claim 1, wherein flux is passed through additional stationary ferrous material on an opposite side of the rotor relative to the rotor.

7. The electric machine of claim 1, further comprising:
   a communications interface between the control circuitry on the printed circuit board and an external device.

8. The electric machine of claim 7, wherein the external device is stationary relative to the rotor.

9. The electric machine of claim 1, wherein the electric machine is an exciter for a controlled field alternator.

10. The electric machine of claim 1, wherein the air gap is a first air gap, and the electric machine is a dual axis generator, the electric machine further comprising:
    an exciter including the plurality of magnets to generate an exciter magnetic field across the first air gap;
    an exciter armature device configured to rotate with respect to the exciter magnetic field and impart a first voltage in a first set of coils at the first air gap;
    a main stator device including a second set of coils; and
    a rotor field device configured to be energized by a current in the first set of coils and generate a main magnetic field that imparts a second voltage on the main stator device at a second air gap,
    wherein the main stator device and the exciter field device lie in on a common plane normal to an axis of rotation and the exciter armature device is inwardly spaced from the exciter, main stator device, and the rotor field device.

11. The electric machine of claim 1, wherein the electric machine is a motor.

12. The electric machine of claim 1, wherein the electric machine is a dual axis motor having an inner stator and an outer stator, the outer stator including the plurality of magnets.

13. The electric machine of claim 1, further comprising:
    a cavity between inner surfaces of a first flux-shaping member and a second flux-shaping member of the plurality of flux-shaping members.

14. An apparatus comprising:
    a stator including at least one flux-shaping member;
    a rotor configured to rotate relative to the stator and spaced from the stator by an air gap;
    a first magnet rigidly mounted to the at least one flux-shaping member;
    a second magnet rigidly mounted to the at least one flux-shaping member, wherein the first magnet and the second magnet have a first magnetic permeability and the at least one flux-shaping member has a second magnetic permeability that is higher than the first magnetic permeability; and
    a control system controlling a measured quantity to a target, wherein the rotor and the control system are combined on a single printed circuit board,
    wherein the first magnet and second magnet are positioned to provide additive flux to the rotor through the air gap, the magnetic flux from the first magnet passes through two poles of the rotor and stator and the magnetic flux from the second magnet passes through two poles of the rotor and the stator,
    wherein the first magnet and the second magnet are positioned to shape the flux from the plurality of magnets and increase a flux density delivered to the rotor.

15. The apparatus of claim 14, wherein the control system controls an excitation level to a controlled-field electric machine and the measured quantity is an excitation level and the target is an excitation level.

16. The control system of claim 14, wherein the target is communicated to the control system from an external device, wherein the external device is mechanically attached to the stator and the control system is mechanically attached to the rotor.

17. The apparatus of claim 14, further comprising:
    a cavity between inner surfaces of a first flux-shaping member and a second flux-shaping member.

18. An apparatus comprising:
a stator including at least one flux-shaping member;
a rotor configured to rotate relative to the stator and spaced from the stator by an air gap;
a first magnet rigidly mounted to the at least one flux-shaping member;
a second magnet rigidly mounted to the at least one flux-shaping member,
wherein the first magnet and second magnet are positioned to provide additive flux to the rotor through the air gap, the magnetic flux from the first magnet passes through two poles of the rotor and stator,
wherein the first magnet and the second magnet are positioned to shape the flux from the plurality of magnets and increase a flux density delivered to the rotor; and
a control system controlling a measured quantity to a target, wherein the rotor and the control system are combined on a single printed circuit board.

19. The apparatus of claim 18, wherein the at least one flux-shaping member includes a first flux-shaping member and a second flux-shaping member, and a cavity is formed between inner surfaces of the first flux-shaping member and the second flux-shaping member.

* * * * *